US012695249B2

(12) United States Patent
Jin et al.

(10) Patent No.: US 12,695,249 B2
(45) Date of Patent: Jul. 28, 2026

(54) TERMINAL POSITION ASSURANCE MEMBER, ELECTRICAL CONNECTOR COMPRISING THE SAME, AND ELECTRICAL CONNECTOR ASSEMBLY COMPRISING THE SAME

(71) Applicant: MOLEX, LLC, Lisle, IL (US)

(72) Inventors: Jang Bum Jin, Incheon (KR); Jong Deok Park, Siheung-si (KR); Sa Cheol Hong, Uiwang-si (KR)

(73) Assignee: Molex, LLC, Lisle, IL (US)

( * ) Notice: Subject to any disclaimer, the term of this patent is extended or adjusted under 35 U.S.C. 154(b) by 496 days.

(21) Appl. No.: 18/275,222

(22) PCT Filed: Jan. 27, 2022

(86) PCT No.: PCT/IB2022/050698
§ 371 (c)(1),
(2) Date: Aug. 1, 2023

(87) PCT Pub. No.: WO2022/172112
PCT Pub. Date: Aug. 18, 2022

(65) Prior Publication Data

US 2024/0072492 A1 Feb. 29, 2024

(30) Foreign Application Priority Data

Feb. 9, 2021 (KR) ........................ 10-2021-0018480

(51) Int. Cl.
*H01R 13/639* (2006.01)
*H01R 13/629* (2006.01)

(52) U.S. Cl.
CPC ......... *H01R 13/639* (2013.01); *H01R 13/629* (2013.01)

(58) Field of Classification Search
CPC ........................ H01R 13/4368; H01R 13/4367
(Continued)

(56) References Cited

U.S. PATENT DOCUMENTS 5,059,142 A * 10/1991 Ohta .................. H01R 13/4368 439/752
5,108,319 A * 4/1992 Tsuji .................. H01R 13/4368 439/752
(Continued)

FOREIGN PATENT DOCUMENTS

JP H0636235 U 5/1994
JP H09106875 A 4/1997
(Continued)

OTHER PUBLICATIONS

International Preliminary Report on Patentability received for PCT Application No. PCT/IB2022/050698, mailed on Aug. 24, 2023, 07 pages.
(Continued)

*Primary Examiner* — Neil Abrams

(57) ABSTRACT

An electrical connector according to a disclosed embodiment includes a housing having a terminal receiving opening, and a TPA member mounted outside the terminal receiving opening to fix a position of a terminal. The TPA member includes first and second side cantilever arms which are extended from both ends of the TPA member, respectively, and are positioned outside a sidewall of the housing, the housing is not in contact with the TPA member in a preliminary mounting position, and the housing is latch-coupled with the first and second side cantilever arms in a final mounting position.

14 Claims, 18 Drawing Sheets

(58) Field of Classification Search
USPC .......................................................... 439/752
See application file for complete search history.

(56) References Cited

U.S. PATENT DOCUMENTS

| | | | | |
|---|---|---|---|---|
| 5,183,418 | A * | 2/1993 | Yamanashi ........ | H01R 13/4368 439/752 |
| 5,486,118 | A | 1/1996 | Colleran et al. | |
| 12,525,736 | B2 * | 1/2026 | Tanaka ............... | H01R 13/4367 |
| 2009/0247000 | A1 | 10/2009 | Shuey | |
| 2010/0055954 | A1 | 3/2010 | Martin et al. | |
| 2010/0167569 | A1 | 7/2010 | Stoner | |
| 2018/0301842 | A1 | 10/2018 | Somanathapura Ramanna et al. | |

FOREIGN PATENT DOCUMENTS

| | | | |
|---|---|---|---|
| JP | 2008147074 | A | 6/2008 |
| JP | 2008198554 | A | 8/2008 |
| JP | 2015144083 | A | 8/2015 |
| KR | 20080082232 | A | 9/2008 |
| KR | 20080088899 | A | 10/2008 |
| KR | 20090022370 | A | 3/2009 |
| KR | 20100006546 | U | 6/2010 |
| KR | 20100008467 | U | 8/2010 |
| WO | 2020137454 | A1 | 7/2020 |

OTHER PUBLICATIONS

International Search Report and Written Opinion received for PCT Application No. PCT/IB2022/050698, mailed on Apr. 28, 2022, 08 pages.

* cited by examiner

Fig. 8
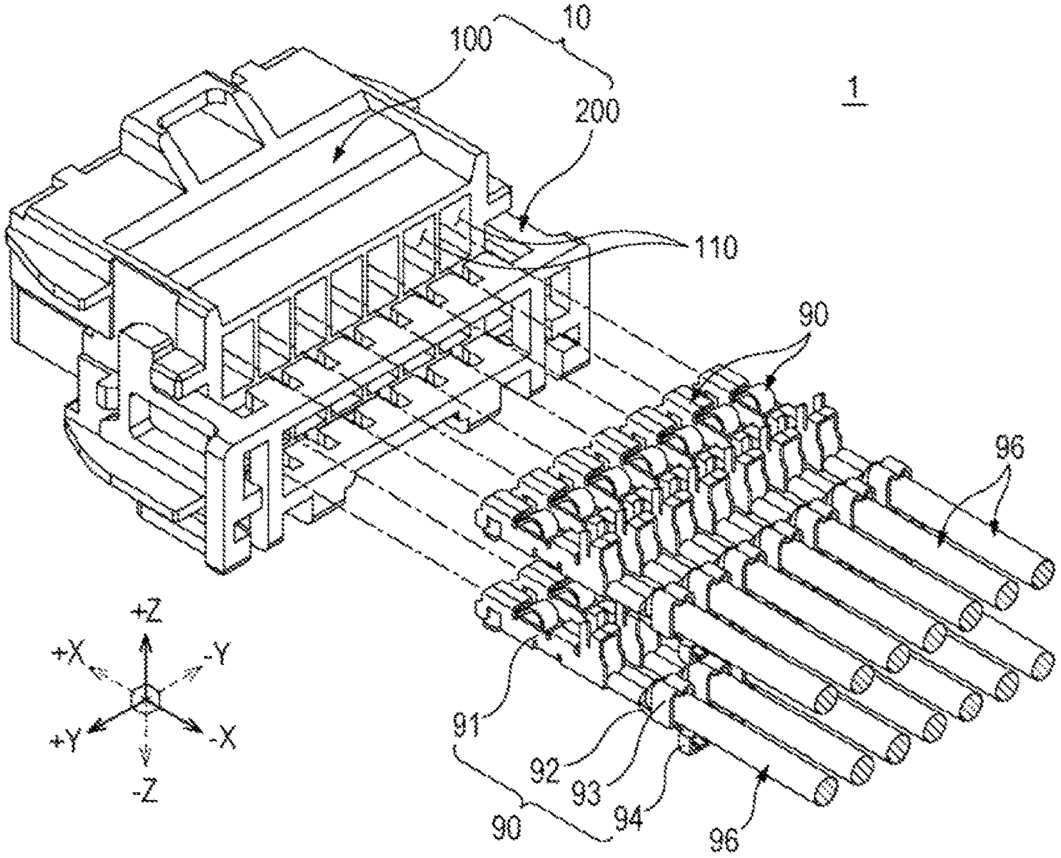
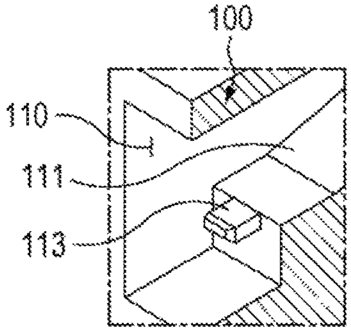
Fig. 9A
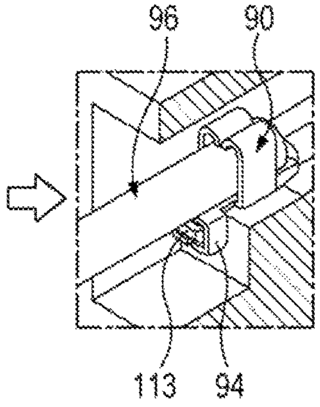
Fig. 9B
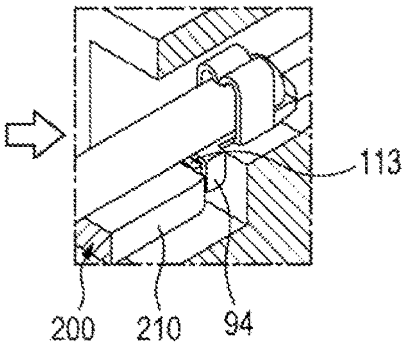
Fig. 9C

TERMINAL POSITION ASSURANCE MEMBER, ELECTRICAL CONNECTOR COMPRISING THE SAME, AND ELECTRICAL CONNECTOR ASSEMBLY COMPRISING THE SAME

RELATED APPLICATION

This application is a U.S. National Phase Patent Application of International Patent Application No. PCT/IB2022/050698, filed on Jan. 27, 2022, which claims priority to Korean Patent Application No. 10-2021-0018480 filed on Feb. 9, 2021, both of which are incorporated herein by reference in their entireties.

This application claims priority to Korean Patent Application No. 10-2021-0018480 filed on Feb. 9, 2021, which is incorporated herein by reference in its entirety.

TECHNICAL FIELD

The present disclosure relates to a wire-to-wire electrical connector or a wire-to-board electrical connector, and more particularly, to an electrical connector including a terminal position assurance (TPA) member, which allows a terminal to be completely inserted into a housing of the electrical connector, maintains a preferable insertion position, and prevents separation of the terminal.

BACKGROUND ART

Typically, an electrical connector may include a housing to electrically connect female and male connectors, and a plurality of electrical conductive terminals inserted into a plurality of openings formed on one side of the housing, respectively. A TPA member (or a terminal position assurance member, a terminal holding portion, an auxiliary locking portion) is known to be used to detect incomplete insertion or incomplete coupling of a terminal and to maintain and fix a preferable terminal coupling state in order to prevent incomplete insertion or incomplete coupling of the terminal.

The TPA member may be used to detect that one or more terminals are not completely mounted by identifying an incomplete coupling state of the TPA member, and to move the incompletely inserted terminal to a preferable insertion position by itself in order to place the incompletely inserted terminal in position.

The use of the TPA member may be required to assure a preferable position of a terminal and to assure coupling between terminals, but the use of the TPA member may increase the number of components and increase assembly processes, and accordingly, there may be problems that a cost increases and work efficiency is degraded.

Korean Patent Laid-Open Publication No. 10-2009-0022370 (published on Mar. 4, 2009) discloses an electrical connector in which one TPA member is coupled both two connector housings. Since the TPA member is manufactured as a separate member from the connector housing and then is assembled with the connector housing through an additional process, there is still a problem that work efficiency is degraded in view of time and cost due to the additional assembly process.

The present disclosure provides solving the above-mentioned problems through a simple and effective combination of a connector housing and a TPA member.

Prior Art Documents: Patent Documents: Patent Literature 1 Korean Patent Laid-Open Publication No. 10-2009-0022370 (published on Mar. 4, 2009)

SUMMARY

An object of the present disclosure is to provide an electrical connector including a TPA member, which has a small number of components and is manufactured by a simple manufacturing and assembling process.

According to an embodiment of the present disclosure, an electrical connector includes a housing having a terminal receiving opening, and a TPA member mounted outside the terminal receiving opening to fix a position of a terminal. The TPA member includes first and second side cantilever arms which are extended from both ends of the TPA member, respectively, and are positioned outside a sidewall of the housing. The housing is not in contact with the TPA member in a preliminary mounting position. The housing is latch-coupled with the first and second side cantilever arms in a final mounting position.

In an embodiment, the housing may further include a locking projection to prevent the TPA member in the preliminary mounting position from being separated in the opposite direction of a mounting direction toward the housing.

In an embodiment, the TPA member may include at least one bottom cantilever arm which is extended from a lower portion of the TPA member and is positioned outside a bottom of the housing. The at least one bottom cantilever arm may be latch-coupled with the housing in the final mounting position. The housing may further include at least one rotation prevention projection formed on a sidewall of the housing to prevent the TPA member from being separated from the housing.

In an embodiment, the housing and the TPA member may be formed by injecting molding a single time in a single injection mold and may be disposed in the preliminary mounting position as they are.

In an embodiment, the housing may further include a guide rib to guide a movement of the TPA member when the TPA member moves from the preliminary mounting position to the final mounting position.

In an embodiment, the TPA member may further include a plurality of toothed portions which are disposed outside the plurality of terminal receiving openings of the housing in the preliminary mounting position.

In an embodiment, each of the plurality of terminal receiving openings of the housing may include a finger portion disposed therein to prevent the terminal from being separated or shaking in a direction perpendicular to a receiving direction of the terminal after the terminal is mounted in the terminal receiving opening.

In an embodiment, in the final mounting position, each of the plurality of toothed portions may prevent the terminal from being separated or shaking forward and backward in the receiving direction of the terminal in cooperation with the finger portion of the corresponding terminal receiving opening.

In an embodiment, the housing may further include a connecting portion which is disposed on a side facing the plurality of terminal receiving openings to be coupled with another separate electrical connector. The electrical connector may be coupled with another electrical connector having a connecting portion of the same shape as the connecting portion in a rotational symmetry state.

In an embodiment, the plurality of terminal receiving openings may have terminal receiving openings of a first group and terminal receiving openings of a second group which are arranged in two rows one on the other.

In an embodiment, the housing may include a female latch portion on one side and a male latch portion on the other side facing the one side. The male latch portion may have a bending portion of a cascade shape.

According to an embodiment of the present disclosure, a TPA member is mounted outside a housing of an electrical connector to fix positions of a plurality of terminals. The TPA member includes first and second side cantilever arms which are extended from both ends of the TPA member, respectively, and are positioned outside a sidewall of the housing. The TPA member is not in contact with the housing in a preliminary mounting position. The first and second side cantilever arms may be latch-coupled with the housing in a final mounting position.

In an embodiment, the TPA member may further include at least one bottom cantilever arm which is extended from a lower portion of the TPA member and is positioned outside a bottom of the housing, and is latch-coupled with the housing in the final mounting position; and a plurality of toothed portions which are disposed outside a plurality of terminal receiving openings of the housing in the preliminary mounting position. Each of the plurality of toothed portions in the final mounting position may be inserted into the corresponding terminal receiving opening to prevent separation or shaking forward and backward in a receiving direction of the terminal.

According to an embodiment of the present disclosure, an electrical connector assembly includes: the electrical connector; and an electrical conductive terminal which is fixed to the electrical connector.

In an embodiment, the electrical connector may be coupled with another electrical connector of the same shape as the electrical connector in a rotational symmetry state.

According to an embodiment of the present disclosure, the housing and the TPA may be injection molded at the same time through a single process in a preliminary mounting position, and the TPA may be easily mounted to a final mounting position, so that a manufacturing process is simplified and a time and a cost is saved.

According to an embodiment of the present disclosure, when the housing and the TPA are in the preliminary mounting positions, the housing and the TAP are prevented from being separated from the preliminary mounting position, so that it is easy to assembly and the TPA is prevented from being separated from the housing and being lost.

Other objects, features, and advantageous effects of the present disclosure will be clearly understood based on the following detailed descriptions for embodying the present disclosure in relation to the accompanying drawings. In the drawings, the same reference numerals indicate the same components. Description of the drawings is as follows.

BRIEF DESCRIPTION OF DRAWINGS

FIG. 8 is a perspective view of the electrical connector 10 of FIG. 6, illustrating that the TPA member in the preliminary mounting position is not separated from the housing.

FIG. 9 is a partial cross-sectional perspective view illustrating a process in which a terminal is inserted into the housing in the electrical connector 10 of FIG. 6 and moves from the preliminary mounting position to a final mounting position, along with a finger portion 113 for fixing the terminal.

DETAILED DESCRIPTION OF THE PREFERRED EMBODIMENTS

Figure 1:
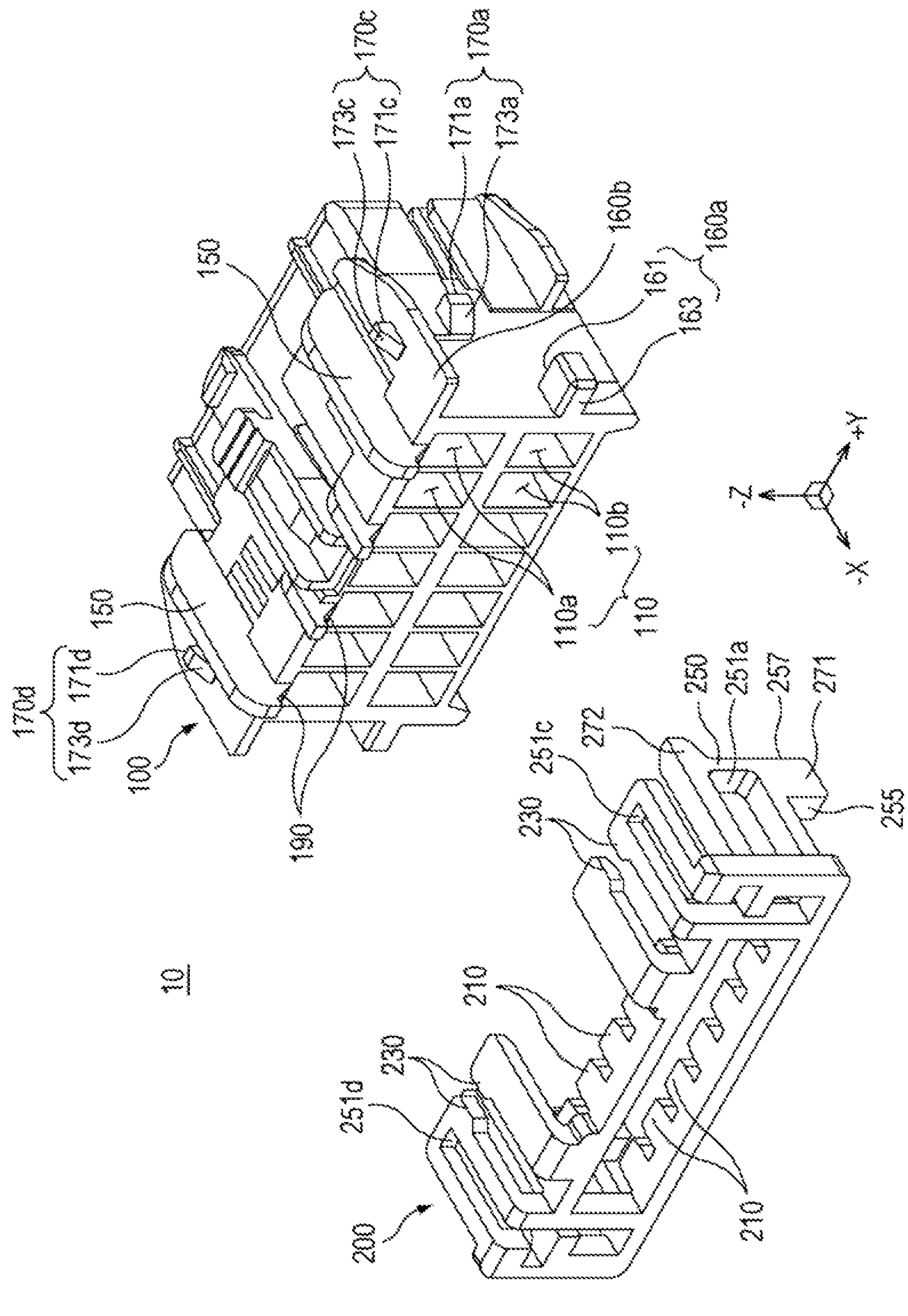
FIG. 1 is a perspective view of an electrical connector 10 according to a first embodiment of the present disclosure, in which a housing and a TPA member are completely separated from each other.

Embodiments of the present disclosure are illustrated for the purpose of explaining the technical concept of the present disclosure. The right scope of the present disclosure is not limited to embodiments suggested hereinbelow or detailed descriptions of these embodiments.

All technical terms and scientific terms used in the present disclosure have meanings normally understood by those skilled in the art to which the present disclosure belongs unless otherwise defined. All terms used in the present disclosure are selected for the purpose of explaining the present disclosure more clearly, and are not selected to limit the right scope of the present disclosure.

It should be understood that the terms "comprises", "includes", "has" used in the present disclosure are open-ended terms that have possibility of including other embodiments unless phrases or sentences including corresponding expressions indicate otherwise.

The singular forms used in the present disclosure include the plural forms as well unless the context clearly indicates otherwise, and this is equally applied to the singular forms described in the claims.

Such terms "first" and "second" used in the present disclosure are used to simply distinguish a plurality of components from one another, and do not limit the components in the aspect of order or importance.

Referring to the drawings, the present disclosure will be described with reference to space orthogonal coordinates by the X-axis, Y-axis, and Z-axis which are orthogonal to one another. That is, respective components of embodiments on the XYZ orthogonal coordinates will be described. Each axis direction (X-axis direction, Y-axis direction, Z-axis direction) refers to both directions in which each axis extends. Each axis direction with the '+' sign (+X-axis direction, +Y-axis direction, +Z-axis direction) refers to a positive direction which is any one direction of both directions in which each axis extends. Each axis direction with the '−' sign (−X-axis direction, −Y-axis direction, −Z-axis direction) refers to a negative direction which is the other one of both directions in which each axis extends. These terms are merely references for easy understanding of the present disclosure, and each direction may be defined differently according to a reference point.

Hereinafter, embodiments of the present disclosure will be described with reference to the accompanying drawings. In the accompanying drawings, the same reference numerals are used for the same or corresponding components. In explaining the following embodiments, a redundant explanation of the same or corresponding components may be omitted. However, even when description of a component is omitted, it is not intended that the component is not included in a certain embodiment.

Figure 2:
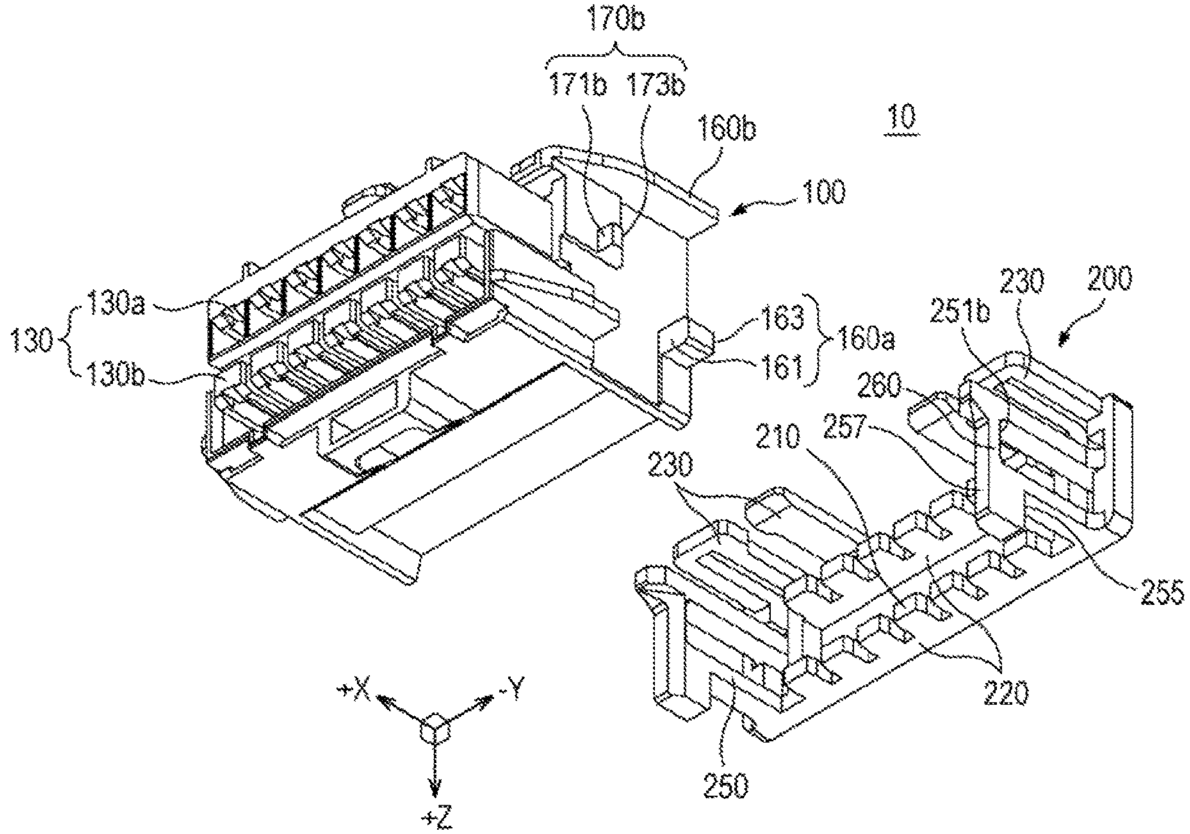
FIG. 2 is a perspective view of the electrical connector 10 of FIG. 1 as viewed from a different direction.
Figure 3:
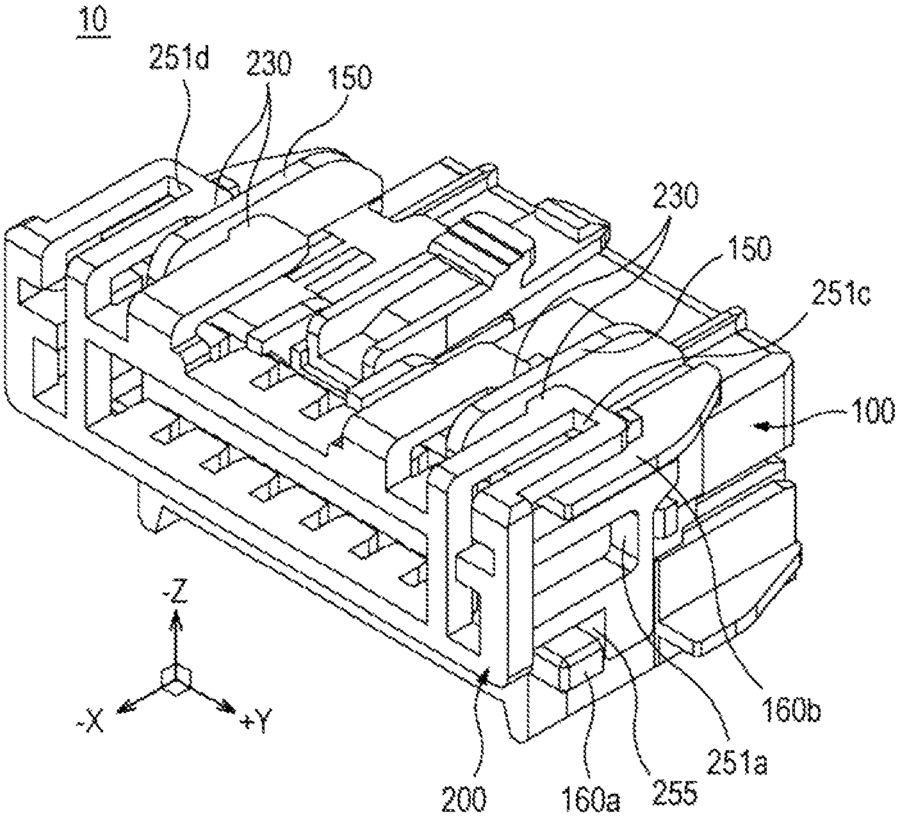
FIG. 3 is a perspective view of the electrical connector 10 according to the first embodiment of the present disclosure in a state where the housing and the TPA member are in preliminary mounting positions.
Figure 5:
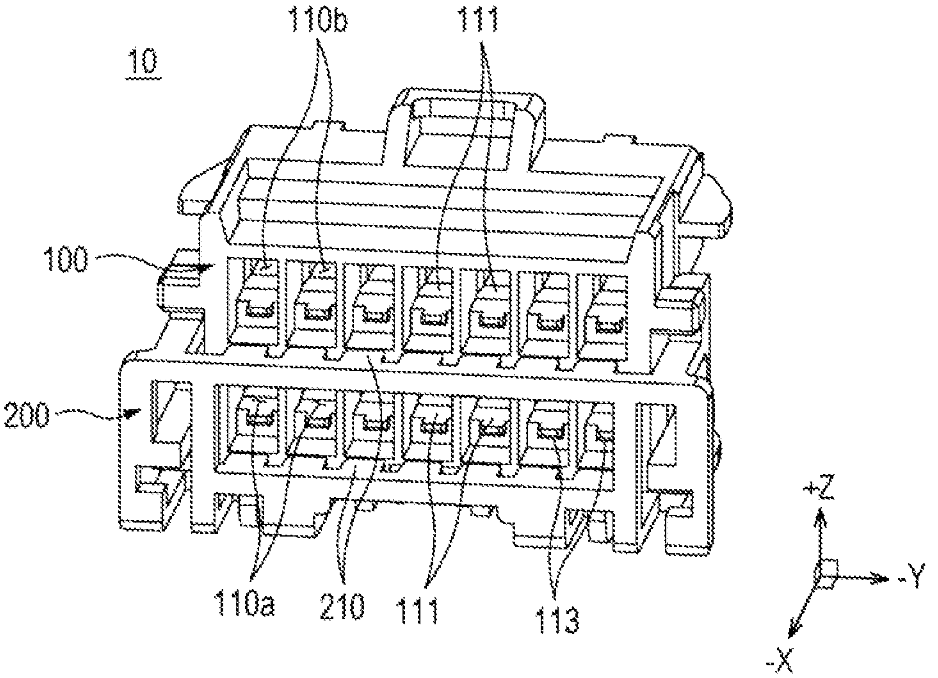
FIG. 5 is a perspective view of the electrical connector 10 of FIG. 3 as viewed from the TPA member.

FIGS. 1 and 2 are perspective views of an electrical connector 10 according to a first embodiment of the present disclosure, in which a housing 100 and a TPA member 200 are completely separated from each other. FIGS. 3 and 5 are perspective views of the electrical connector 10, in which the housing 100 and the TPA member 200 are in preliminary mounting positions. An electrical connector assembly 1 includes the electrical connector 10, an electrical conductive terminal 90 (FIG. 8) fixed to the electrical connector 10, and a conducting wire 96 extended from the terminal 90. The electrical connector 10 includes the housing 100 and the TPA member 200 coupled with the housing 100. The housing 100 and the TPA member 200 may be formed by injection molding a single time in a single injection mold. When the injection molding process is performed, the housing 100 and the TPA member 200 are formed to be positioned in preliminary mounting positions at the same time as the injection molding is finished. The housing 100 and the TPA member 200 may be formed with the same material. FIGS. 1 and 2 illustrate a virtual state in which the housing 100 and the TPA member 200 are completely separated from each other for convenience of explanation of respective components.

In FIGS. 1 and 2, the electrical connector 10 includes the housing 100 having a plurality of terminal receiving openings 110, and the TPA member 200 which is mounted on an outside of the plurality of terminal receiving openings 110 to fix positions of a plurality of terminals (not shown). The TPA member 200 includes a TPA body 220, and first and second side cantilever arms 250, 260 which are extended from both ends of the TPA body 220, respectively, and are positioned on an outside of a sidewall (a sidewall perpendicular to the Y-axis direction) of the housing 100. The TPA member 200 and the housing 100 are configured to have a gap therebetween not to contact each other in the injection molding process and preliminary mounting positions. The TPA member 200 may have a plurality of toothed portions 210.

In FIGS. 1 to 3, the TPA member 200 may further include at least one bottom cantilever arm 230 which is extended from a lower portion of the TPA member 200 and is positioned on an outside of a bottom (a sidewall perpendicular to the −Z-axis direction) of the housing 100. The housing 100 may include at least one guide rib 150 to guide a movement of the TPA member 200 in the X-axis direction in the preliminary mounting position with the TPA member 200. The guide rib 150 may include a plurality of guide ribs 150 which protrude from a bottom to the outside in the Z-axis direction and are extended along the bottom in the X-axis direction, and are spaced apart from one another in the Y-axis direction. The bottom cantilever arm 230 of the TPA member 200 may be configured to be slidable along the guide rib 150. One pair of bottom cantilever arms 230 corresponding to one pair of guide ribs 150 are provided, so that the TPA member 200 is prevented from rotating about the Z-axis by a predetermined level or more.

Figure 4:
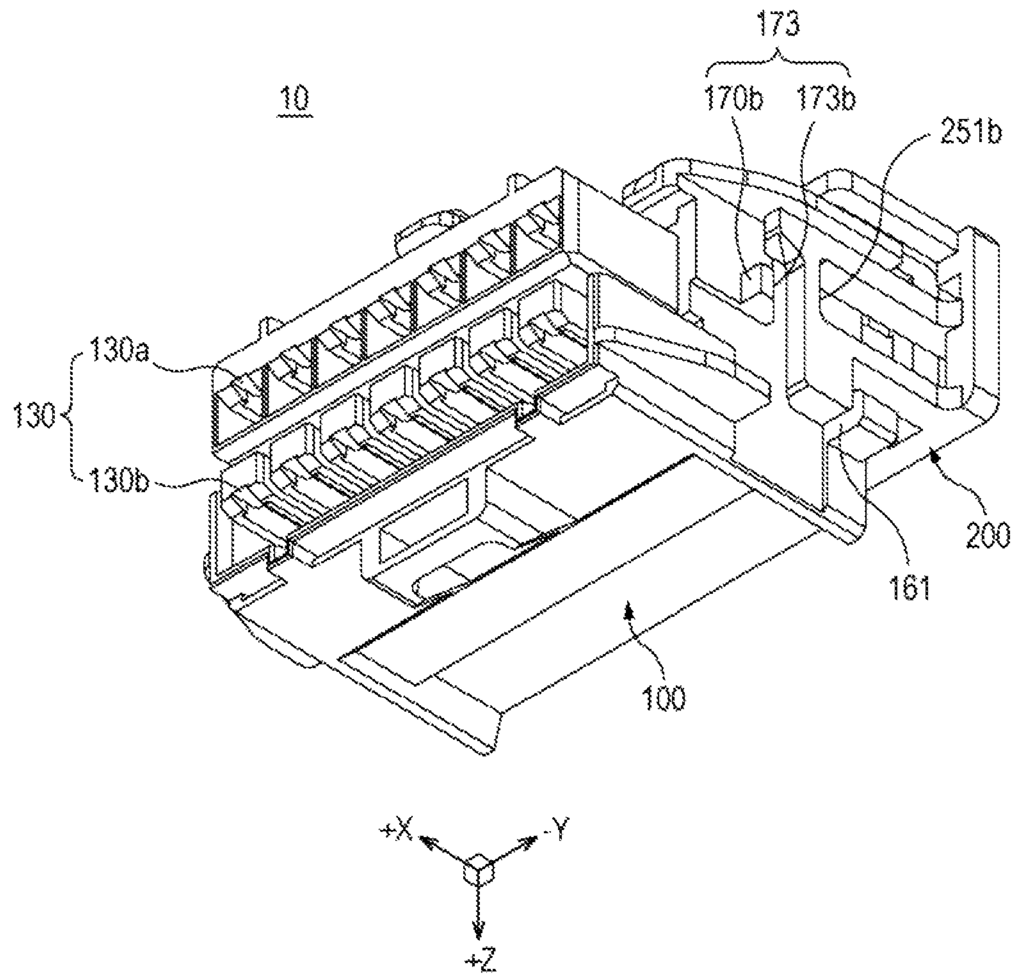
FIG. 4 is a perspective view of the electrical connector 10 of FIG. 3 as viewed from a different direction.

In FIGS. 3 and 4, in the preliminary mounting position, the TPA body 220, the first and second side cantilever arms 250, 260, and the bottom cantilever arm 230 of the TPA member 200 are positioned outside the housing 100 with a gap from the housing 100. Due to this configuration, the housing 100 and the TPA member 200 may be formed by injection molding a single time in a single injection mold.

Figure 6:
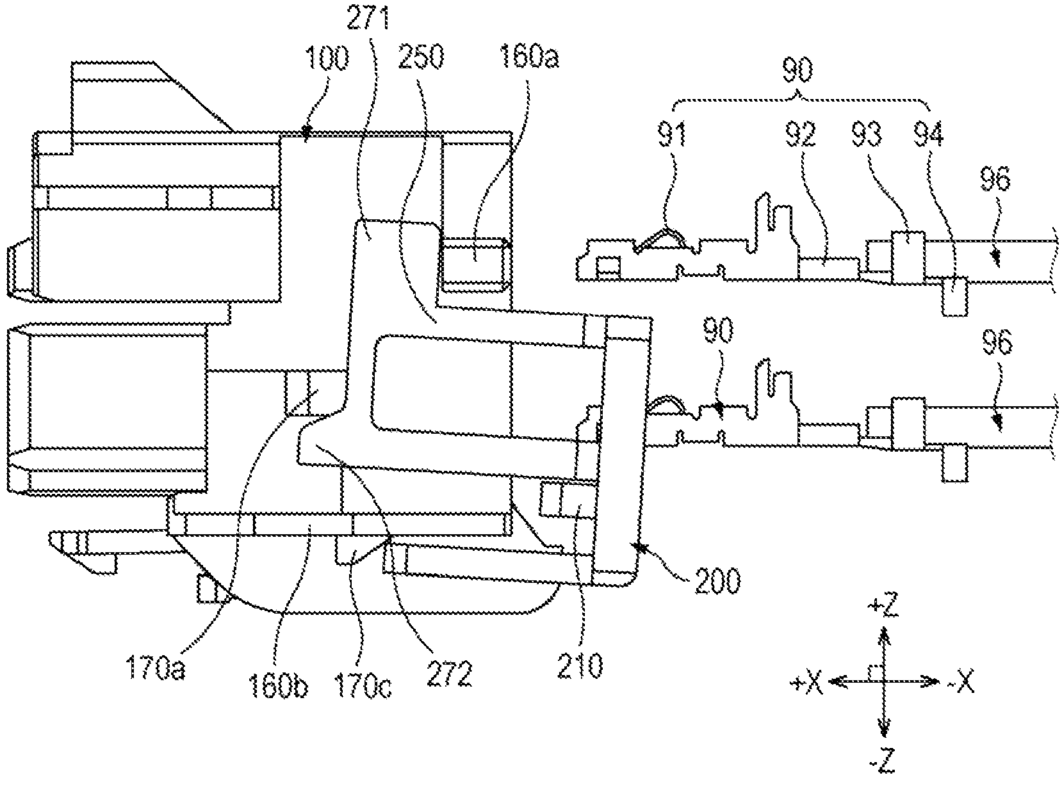
FIG. 6 is a side view illustrating the electrical connector 10 according to the first embodiment of the present disclosure, along with a terminal 90, in which the housing and the TPA member are in the preliminary mounting positions.
Figures 11A, 11B, 11C:
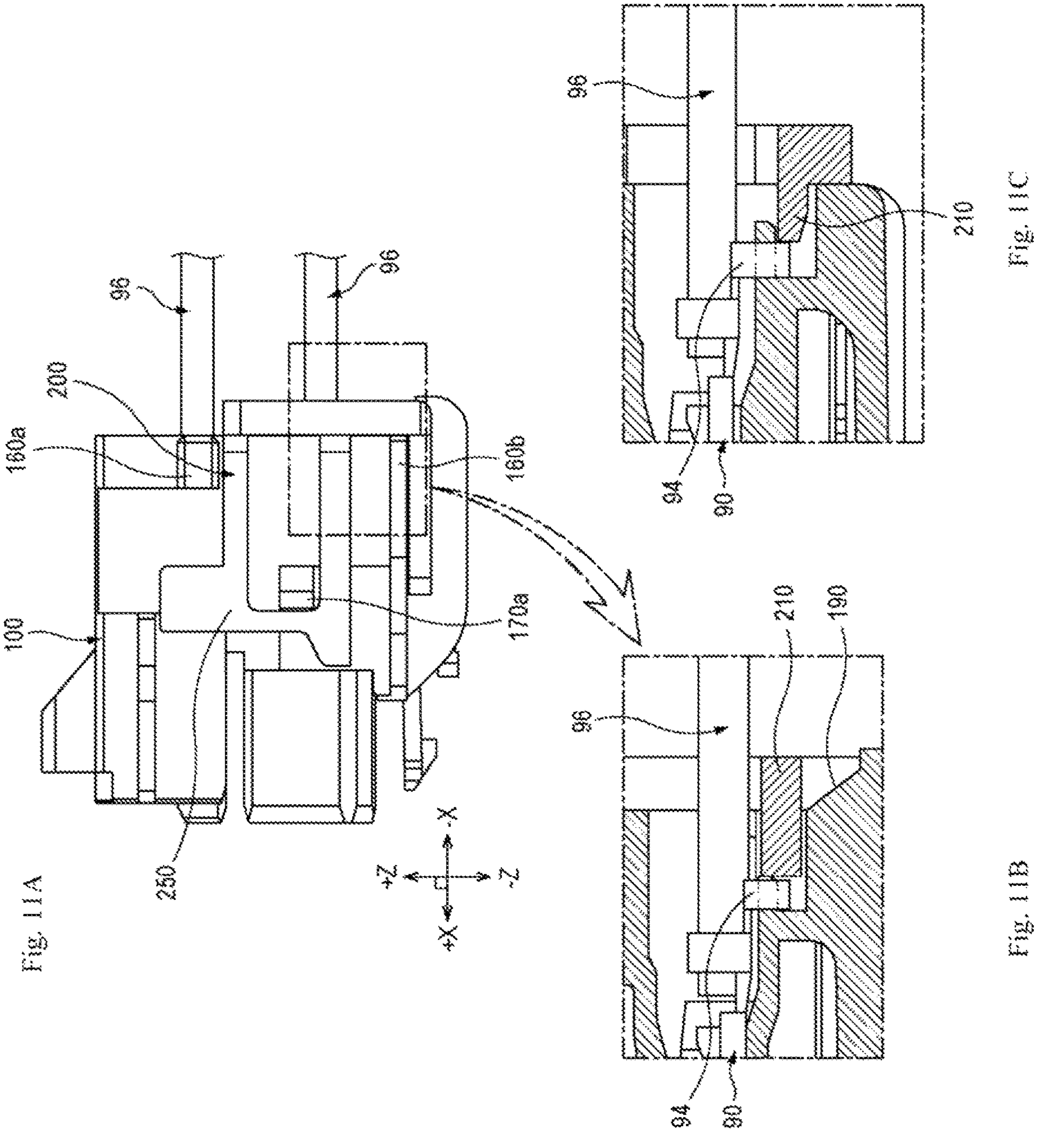
FIG. 11 is a side view and a partial cross-sectional view of the electrical connector 10 of FIG. 6, illustrating a state in which the terminal is inserted into the housing and then the housing and the TPA member are in the final mounting positions, and is a cross-sectional view of the corresponding portion of the electrical connector 50 according to another embodiment.

In FIGS. 5 and 6, the plurality of toothed portions 210 are disposed outside the plurality of terminal receiving openings 110 of the housing 100, respectively, in the preliminary mounting position of the TPA member 200. The plurality of toothed portions 210 are configured to be inserted into the plurality of terminal receiving openings 110 of the housing 100, respectively, according to a relative movement of the TPA member 200 to the housing 100 from the preliminary mounting position (FIG. 5) to the final mounting position (FIG. 11). The terminal receiving openings 110 may have terminal seating portions 111, respectively. When the terminal 90 is inserted into a passage of the terminal receiving opening 110 of the housing 100, the terminal 90 is positioned on the terminal seating portion 111. When the terminal 90 is positioned on the terminal seating portion 111, the TPA member 200 relatively moves toward the housing 100 from the preliminary mounting position to the final mounting position, and is secured to the housing 100, so that the TPA member 200 functions to maintain the terminal 90 seated on the terminal seating portion 111.

Figure 7:
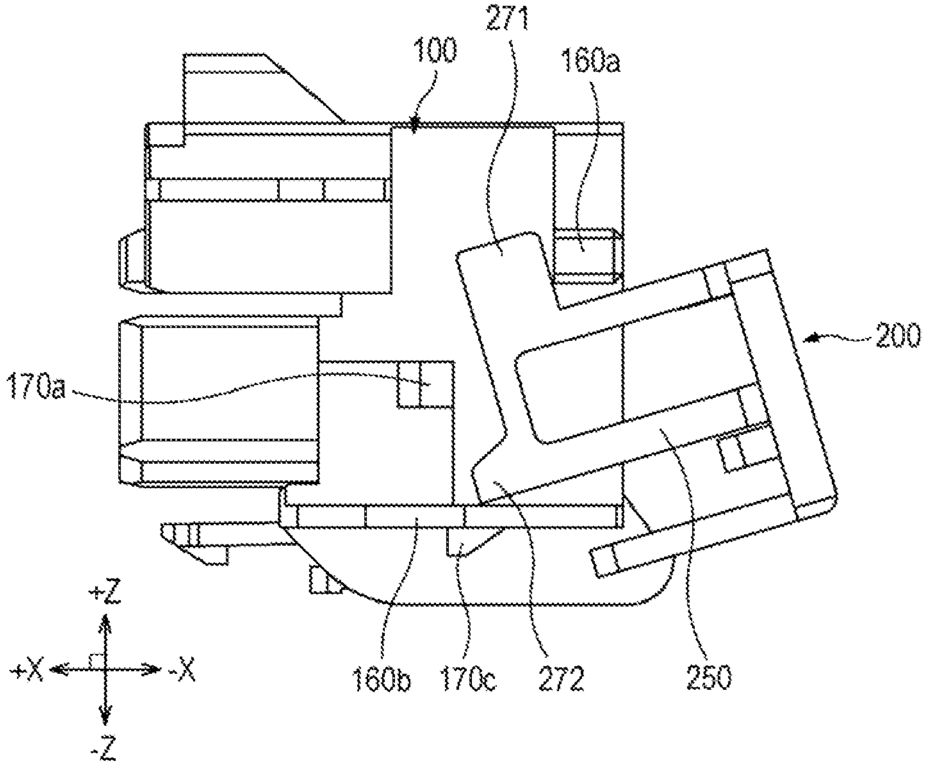
FIG. 7 is a side view of the electrical connector 10 of FIG. 6.

FIGS. 6 and 7 are side views illustrating the electrical connector 10 according to the first embodiment of the present disclosure, along with the terminal 90, in which the housing 100 and the TPA member 200 are in the preliminary mounting positions. As shown in FIGS. 1 and 5, the housing 100 may have arrays 110*a*, 110*b* of two rows of the passage formed by the terminal receiving opening 110. The array of the terminal receiving opening may be formed of an array having one or two or more rows.

The terminal 90 may include a contact portion 91 configured to contact a terminal of another separate electric connector, an extension portion 92 extended from the contact portion 91 in a longitudinal direction, and a conducting wire fixing portion 93 to fix the terminal 90 to the conducting wire 96. The conducting wire 96 having an electrical conductive wire portion is connected to each of the terminals 90. The terminal 90 may include a terminal holder 94 coupled with a finger portion 113 (FIG. 9) of the housing 100, which will be described below. The terminal holder 94 may be formed by bending a metallic material.

In FIGS. 6 and 8, when the TPA member 200 is in the preliminary mounting position, the terminal array 90 is inserted into the housing 100. The housing 100 includes a locking projection 160*a* to prevent the TPA member 200 from being separated from the housing 100 when the TPA member 200 is in the preliminary mounting position or while the terminal array 90 is being inserted into the housing 100. Specifically, the locking projection 160*a* of the housing 100 prevents the TPA member 200 from being separated from the housing 100 by preventing the TPA member 200 from being separated in the opposite direction of a mounting direction toward the housing 100, or from rotating about the Y-axis in the clockwise direction by a predetermined level or more from the direction we are looking at the drawing. The locking projections 160*a* may be formed on left and right sidewalls (both sidewalls perpendicular to the Y-axis direction) of the housing 100, respectively.

In FIG. 6, when the TPA member 200 relatively moves toward the housing 100 from the preliminary mounting position (FIG. 6) to the final mounting position (FIG. 11), the first and second side cantilever arms 250, 260 and the bottom cantilever arm 230 of the TPA member 200 are latch-coupled with sidewalls (a sidewall in the Y-axis direction, a sidewall in the −Z-axis direction) of the housing in their corresponding positions, respectively. A latch means for latch-coupling may be provided on the sidewall of the housing, and the cantilever arm may be provided with a concave portion, a hole, or a sleeve. In another embodiment, the latch means for latch-coupling may have a concave portion, a hole, or a sleeve formed on the housing, and a latch of a hook shape may be provided on the cantilever arm.

The latch-coupling may include flexible and inflexible coupling of various other methods.

Referring to FIGS. 1 to 4, in the first embodiment of the present disclosure, latches 170*a*, 170*b*, 170*c*, 170*d* may be provided on the sidewalls of the housing, and the cantilever arms 250, 260, 230 may include holes to be coupled with the latches. The latches 170*a*, 170*b*, 170*c*, 170*d* may be configured to perform the role of the locking projection for preventing the TPA member 200 from being separated from the housing 100, by preventing the TPA member 200 from rotating about the Y-axis in the clockwise direction by a predetermined level or more from the direction we are looking at the drawing, like the locking projection 160*a* in the preliminary mounting position. To achieve this, the first and second side cantilever arms 250, 260 of the TPA member 200 may include nose 271, 272 portions protruding ends thereof so as to be restricted better than the latches 170*a*, 170*b* during the rotation. The bottom cantilever arm 230 of the TPA member 200 may be secured to a bottom (a surface perpendicular to the −Z axis direction) of the housing 100 in a corresponding position by latch coupling. In the present embodiment, a hole formed on the bottom cantilever arm 230 is secured to the latch 170*c*, 170*d* formed on the housing 100.

Referring to FIGS. 1 and 2, the latches 170*a*, 170*b*, 170*c*, 170*d* may include securing surfaces 171*a*, 171*b*, 171*c*, 171*d* which face the +X-axis direction, and the TPA member 200 may include securing corresponding surfaces 251*a*, 251*b*, 251*c*, 251*d* which face the −X-axis direction to correspond to the securing surfaces. When the housing 100 and the TPA member 200 are in the preliminary mounting positions, the securing corresponding surfaces 251*a*, 251*b*, 251*c*, 251*d* may be positioned in the −X-axis direction with respect to the securing surfaces 171*a*, 171*b*, 171*c*, 171*d*, and, when the housing 100 and the TPA member 200 are in the final mounting positions, the securing corresponding surfaces 251*a*, 251*b*, 251*c*, 251*d* of the TPA member 220 are locked in contact with the securing surfaces 171*a*, 171*b*, 171*c*, 171*d* of the latches.

In the first embodiment, the securing surfaces 171*a*, 171*b*, 171*c*, 171*d* are formed on the latches 170*a*, 170*b*, 170*d*, 170*d*, but the securing surfaces may be formed by various structures such as a concave portion or a stepped portion of the housing. In addition, in the first embodiment, the securing corresponding surface 251*a*, 251*b*, 251*c*, 251*d* of the TPA member 200 is a portion that forms a boundary of the hole of the cantilever arm 250, 260, 230 in the +X-axis direction, but in a second embodiment (FIGS. 16 to 19), described below, the securing corresponding surface of the TPA member may be formed by various structures such as a hook of the cantilever arm.

Figure 18:
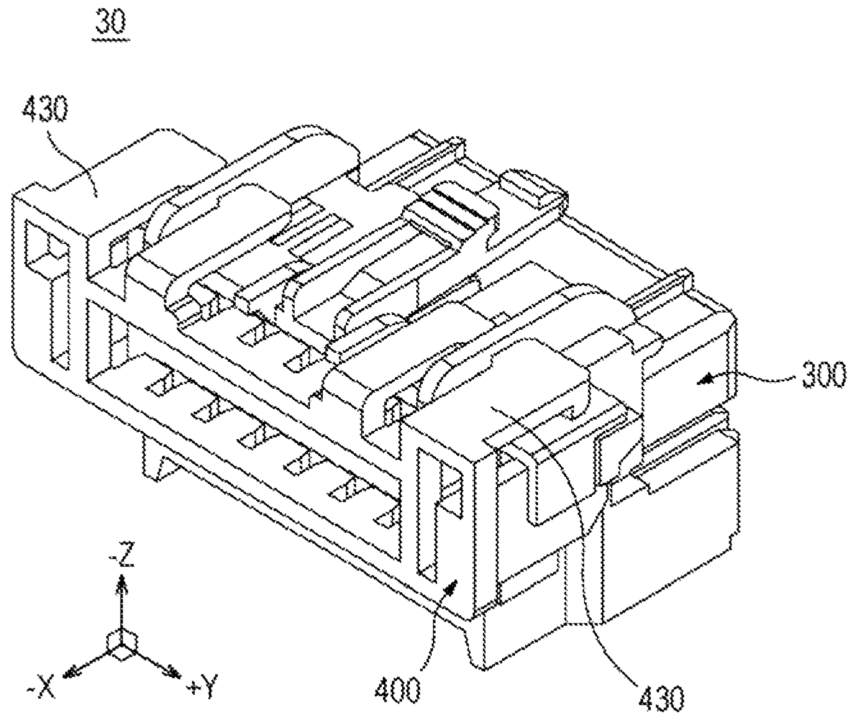
FIG. 18 is a perspective view of the electrical connector 30 of FIG. 17 as viewed from a different direction.
Figure 19:
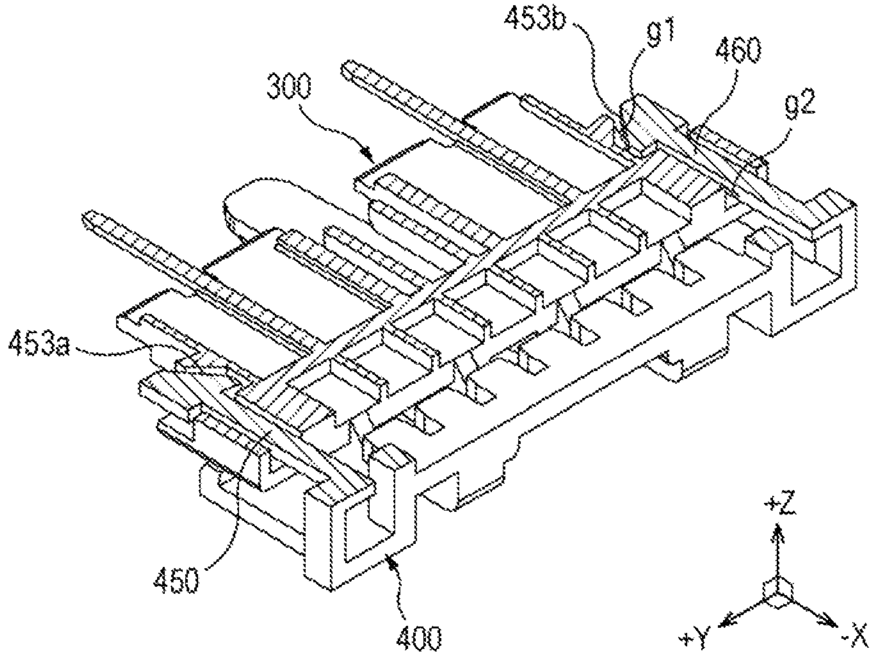
FIG. 19 is a cross-sectional view of the electrical connector 30 of FIG. 16, taken on line S3-S3', when it is in a preliminary mounting position.

In order to guide the securing corresponding surfaces 251*a*, 251*b*, 251*c*, 251*d* of the TPA member 200 to the securing surfaces 171*a*, 171*b*, 171*c*, 171*d* when the TPA member 200 moves from the preliminary mounting position to the final mounting position, securing guide inclined surfaces 173*a*, 173*b*, 173*c*, 173*d* may be formed on surfaces of the latches 170*a*, 170*b*, 170*c*, 170*d* facing the −X-axis direction as in the first embodiment (FIGS. 1 and 2), or securing guide inclined surfaces 453*a*, 453*b* may be formed on a surface of the cantilever arm that faces the +X-axis direction as in the second embodiment, which will be described below (FIGS. 18 and 19). For example, referring to FIGS. 1 and 2, the securing guide inclined surface 173*a*, 173*b*, 173*c*, 173*d* is formed to gradually become higher in a protruding direction of the latch 170*a*, 170*b*, 170*c*, 170*d* toward the +X-axis direction, so that the securing corresponding surface 251*a*, 251*b*, 251*c*, 251*d* of the TPA member 200 is guided to go over the latch 170*a*, 170*b*, 170*c*, 170*d* in the +X-axis direction.

Referring to FIGS. 1 to 4, the locking projection 160*a* includes a restriction surface 161 facing the +X-axis direction, and the TPA member 200 includes a restriction corresponding surface 255 facing the −X-axis direction to correspond to the restriction surface 161. When the housing 100 and the TPA member 200 are in the preliminary mounting positions, the restriction corresponding surface 255 is positioned in the +X-axis direction with respect to the restriction surface 161. When the TPA member 200 moves from the preliminary mounting position in a direction to be completely separated from the housing 100 (−X-axis direction), the restriction surface 161 contacts the restriction corresponding surface 255, thereby preventing the TPA member 200 from being separated from the housing 100.

As described above, in the embodiment having the above-described structure for latch-coupling, securing guide inclined surfaces 173*a*, 173*b*, 173*c*, 173*d* are provided to change a position relationship between the securing surfaces 171*a*, 171*b*, 171*c*, 171*d* of the latch and the securing corresponding surfaces 251*a*, 251*b*, 251*c*, 251*d* of the TPA member on the X-axis. On the other hand, in the embodiment having the locking projection 160*a* of the housing 100 and a corresponding structure of the TPA member 200 to prevent separation, a structure corresponding to the above-described guide inclined surfaces is not provided to prevent the position relationship between the restriction surface 161 of the locking projection and the restriction corresponding surface 255 of the TPA member from being changed on the X-axis. For example, referring to FIGS. 1 and 2 illustrating the virtual separation state, the restriction surface 161 of the locking projection and the restriction corresponding surface 255 of the TPA member are formed as surfaces perpendicular to the X-axis, and a surface 163 of the locking projection 160*a* in the −X-axis direction, and a corresponding surface 257 of the TPA member that faces the surface 163 in the virtual separation state are also formed as surfaces perpendicular to the X-axis. Accordingly, as will be described below, the housing 100 and the TPA member 200 may be configured not to be moved to a complete separation state (FIGS. 1 and 2) from the preliminary mounting position (FIG. 3) without plastic deformation or damage. In addition, the housing 100 and the TPA member 200 may be configured not to be moved to the preliminary mounting position (FIG. 3) from the complete separation state (FIGS. 1 and 2) without plastic deformation or damage.

In FIG. 7, the housing 100 includes a rotation prevention projection 160*b* to prevent the TPA member 200 from rotating about the Y-axis in the counter clockwise direction by a predetermined level or more from the direction we are looking at the drawing. The rotation prevention projection 160*b* prevents the bottom cantilever arm 230 of the TPA member 200 from rotating in the direction the bottom cantilever arm goes away from the bottom of the housing 100, and prevents the TPA member 200 from being separated from the housing 100. The rotation prevention projections 160*b* may be formed on left and right sidewalls (both sidewalls perpendicular to the Y-axis direction) of the housing 100, respectively.

Figures 10A, 10B, 10C:
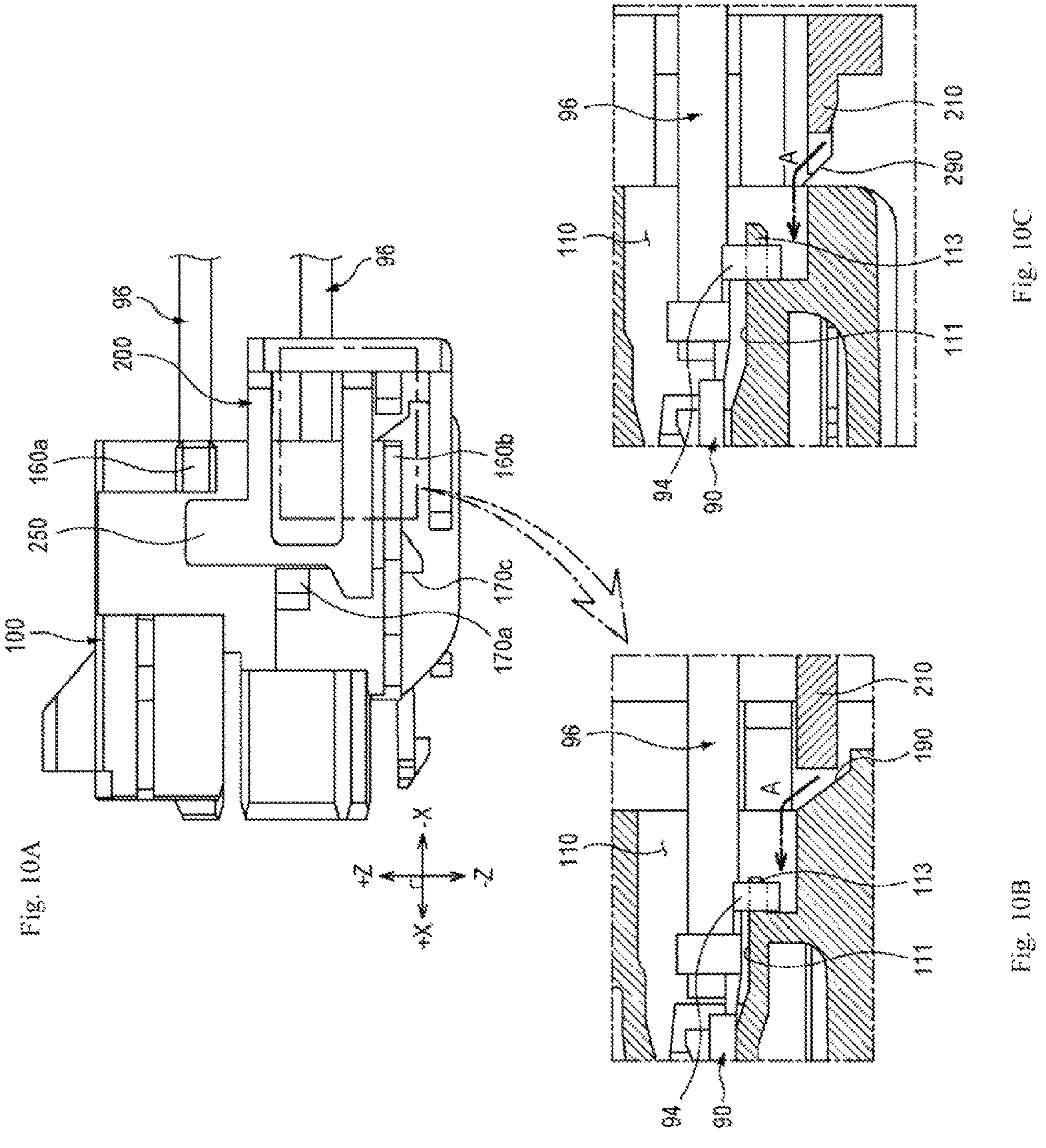
FIG. 10 is a side view and a partial cross-sectional view of the electrical connector 10 of FIG. 6, illustrating a state in which the terminal is inserted into the housing when the electrical connector is in the preliminary mounting position, and is a cross-sectional view of a corresponding portion of an electrical connector 50 according to another embodiment.

FIGS. 9 to 11 illustrate a process in which the terminal 90 is inserted into the housing 100 (FIG. 10) and the TPA member 200 is secured to the housing 100 (FIG. 11) until the housing and TPA member reach the final mounting position from the preliminary mounting position in the electrical connector 10 of FIG. 6. In FIG. 9, each of the terminal receiving openings 110 of the housing 100 includes a finger portion 113 which is coupled with the terminal holder 94 to fix the terminal 90 inserted into the passage of the terminal receiving opening 110. As shown in FIG. 9(*b*), when the terminal 90 is completely inserted into the housing 100, the finger portion 113 may be press-fitted into the terminal holder 94. In FIG. 9(*c*), after the finger portion 113 is coupled with the terminal holder 94, when the TPA member 200 moves to the final mounting position and is coupled to the housing 100, the toothed portion 210 of the TPA member 200 prevents the terminal 90 from being separated or shaking forward and backward in the receiving direction in cooperation with the finger portion 113 of the housing 100. Specifically, in an embodiment, as shown in FIGS. 10(*b*) and 11(*b*), the toothed portion may be configured in contact with or in the proximity of the finger portion 113 of the housing 100. In another embodiment, as shown in FIGS. 10(*c*) and 11(*c*), the toothed portion 210 may be configured without directly contacting the finger portion 113 of the housing 100 and may be configured in contact with or in the proximity of the terminal holder 94 only.

In FIGS. 10(*b*) and 11(*b*), the housing 100 includes an inclined surface 190 for guiding a movement of the toothed portion 210 of the TPA member 200 when the TPA member 200 moves from the preliminary mounting position to the final mounting position. The inclined surface 190 guides the TPA member 200 to slide along the inclined surface 190 and to ascend when the TPA member 200 moves from the preliminary mounting position to the final mounting position, and may guide the arms 250, 260, 230 of the TPA member 200 to go over the latches 170*a*, 170*b*, 170*c*, 170*d* of the housing. In another embodiment, as shown in FIGS. 10(*c*) and 11(*c*), the TPA member 200 may have an inclined portion 290 to guide a movement of the TPA member 200 with respect to the housing 100 by itself when the TPA member 200 moves from the preliminary mounting position to the final mounting position. When the TPA member 200 moves from the preliminary mounting position to the final mounting position, the inclined portion 290 of the TPA member 200 may slide on the housing 100 and may guide the TPA member 200 to ascend, and may guide the bottom cantilever arm 230 of the TPA member 200 to go over the latches 170*c*, 170*d* of the housing and to secure thereto. For example, a TPA member 600 (FIG. 21) according to a third embodiment, which will be described below, may have the inclined portion.

Figure 12:
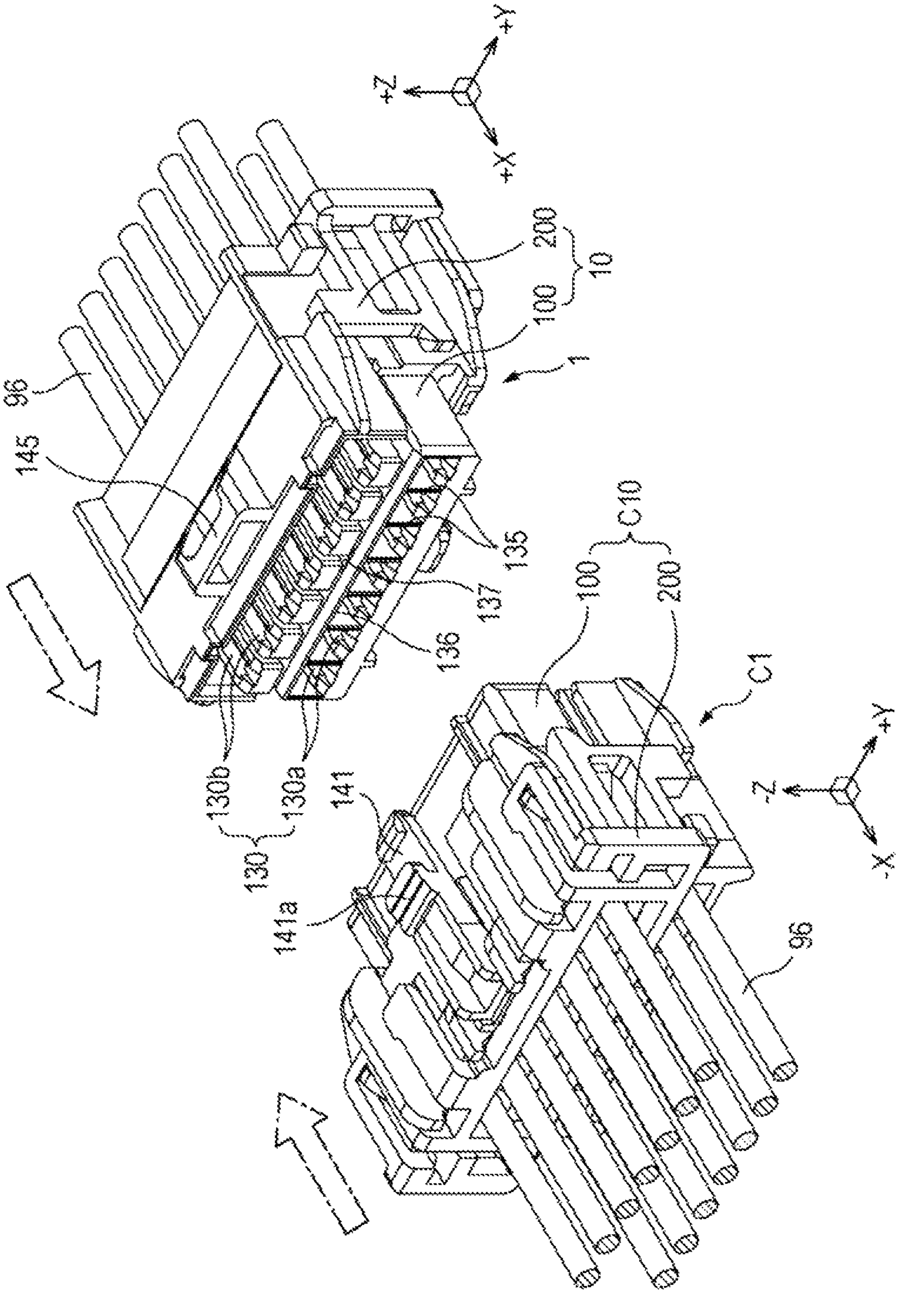
FIG. 12 is a perspective view illustrating a state in which the electrical connector 10 having a plurality of terminals mounted therein according to the first embodiment of the present disclosure is disposed to have rotational symmetry with another electrical connector C10 having the same shape before they are coupled.
Figure 13:
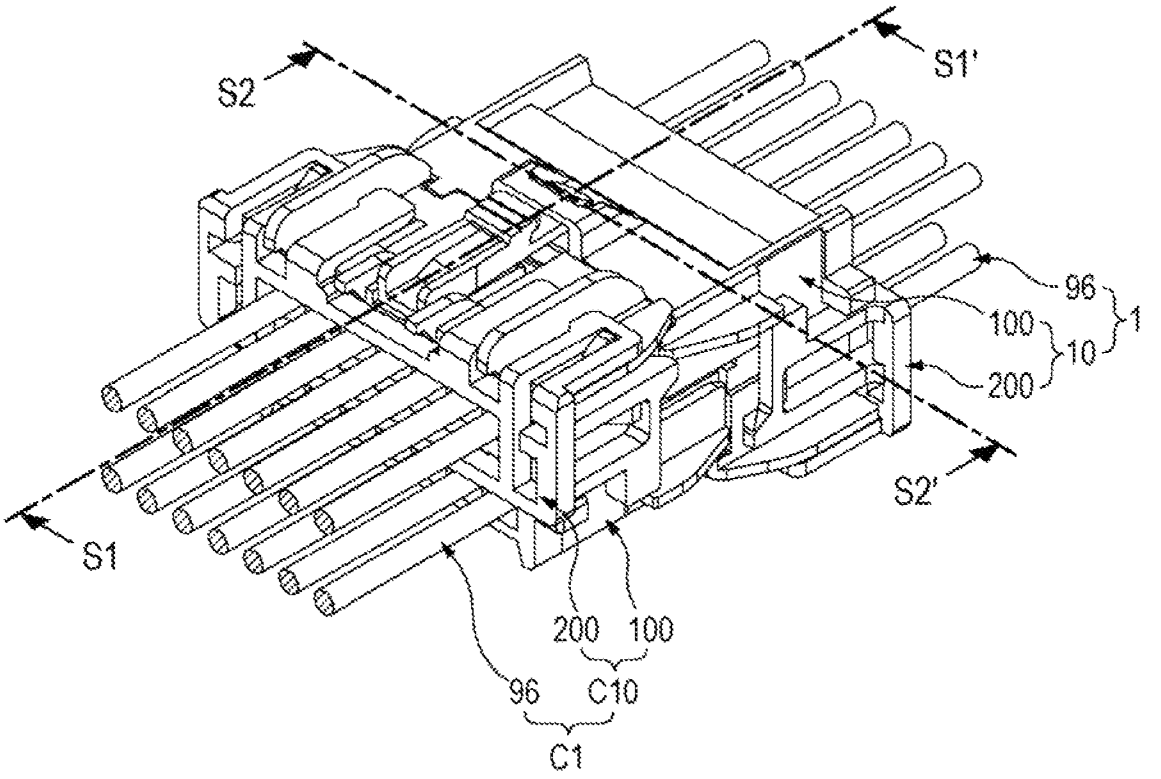
FIG. 13 is a perspective view illustrating a state in which one pair of electrical connectors of FIG. 12 are coupled to each other.
Figure 14:
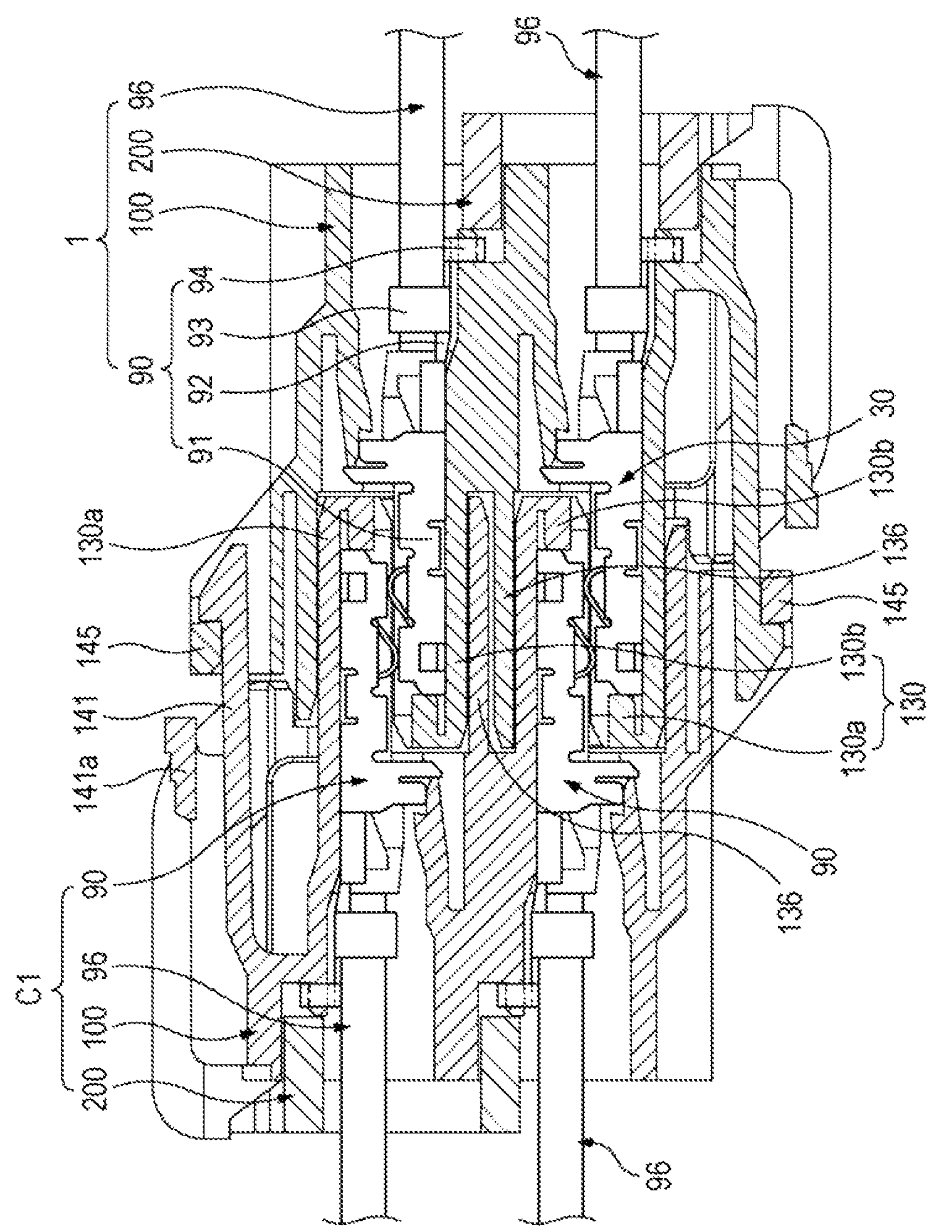
FIG. 14 is a cross-sectional view of the one pair of electrical connectors of FIG. 13, taken on line S1-S1'.
Figure 15:
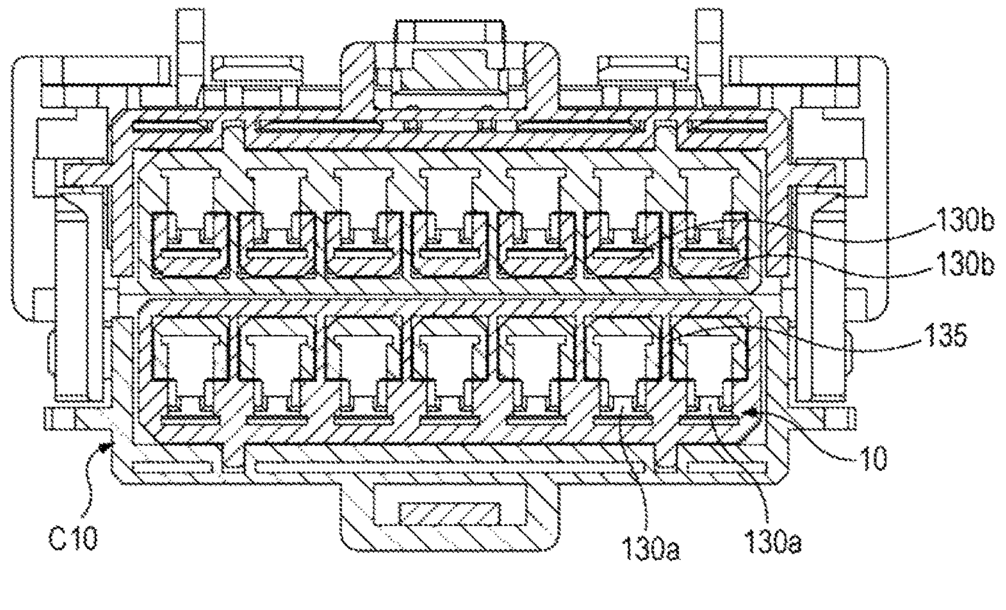
FIG. 15 is a cross-sectional view of the one pair of electrical connectors of FIG. 13, taken on line S2-S2'.

FIG. 12 illustrates a state in which the electrical connector 10 having the plurality of terminals mounted therein according to the first embodiment of the present disclosure is disposed to have rotational symmetry with another electrical connector C10 having the same shape before they are coupled to each other. FIGS. 13 to 15 illustrate a state in which the pair of electrical connector assemblies 1, C1 are coupled with each other. In the present embodiment, the electrical connector 10 is configured, so that the two electrical connectors 10 having the same shape can be coupled to each other. The electrical connectors 10 of the same shape which can be coupled to each other may referred to as "genderless connectors". Only one kind of product may be produced through the genderless connector without having to individually produce a female connector and a male connector, so that a cost and convenience in manufacturing can be enhanced, and a user may use the electrical connector without having to distinguish between a female connector and a male connector, so that use convenience can be enhanced. Hereinafter, descriptions will be provided with reference to embodiments of the genderless connector, but the present disclosure is not limited thereto.

When one electrical connector 10 and another electrical connector C10 are disposed to face each other, and are rotated about the X-axis by 180 degrees, the one pair of electrical connectors 10, C10 may be configured to be able to be coupled with each other. Specifically, the housing 100 of the electrical connector 10 includes a connecting portion 130 disposed on a side facing the plurality of terminal receiving openings 110 to be coupled with another separate electrical connector C10. As shown in FIG. 13, the electrical connector 10 is coupled with another electrical connector C10 having a connecting portion 130 of the same shape as the connecting portion 130 in the rotational symmetry state.

In FIG. 12, the housing 100 may include a plurality of connecting portions 130 corresponding to a plurality of terminals 90. The plurality of connecting portions 130 may have arrays 130*a*, 130*b* of two rows which are disposed one on another. The array of the plurality of connecting portions 130 may be formed of an array of one or two or more rows. In FIGS. 12 and 14, a gap 137 and/or a layer film 136 may be formed between the connecting portion 130*a* of the first row and the connecting portion 130*b* of the second row. In FIG. 15, the housing 100 may include a partition 135 disposed between two adjacent connecting portions among the plurality of connecting portions 130*a*, 130*b*. The plurality of connecting portions 130*a* may form the passages of the terminal receiving openings 110 which are distinguished by the partition 135, respectively. The layer film 136 of the housing 100 of another electrical connector C10 may be inserted into the gap 137 of the housing 100 of the electrical connector 10 of an embodiment. The partition 135, the gap 137, and/or the layer film 136 are formed, so that an insulation effect between adjacent terminals can further be enhanced.

As shown in FIG. 12, in an embodiment, all of the connecting portions 130*a* of the first row may be formed as female connecting portions, and all of the connecting portions 130*b* of the second row may be formed as male connecting portions. They may be disposed vice versa.

In FIG. 12, the housing 100 includes a female latch portion 145 on one side and a male latch portion 141 on the other side facing the one side, and the male latch portion may have a bending portion 141*a* of a cascade shape.

Figure 16:
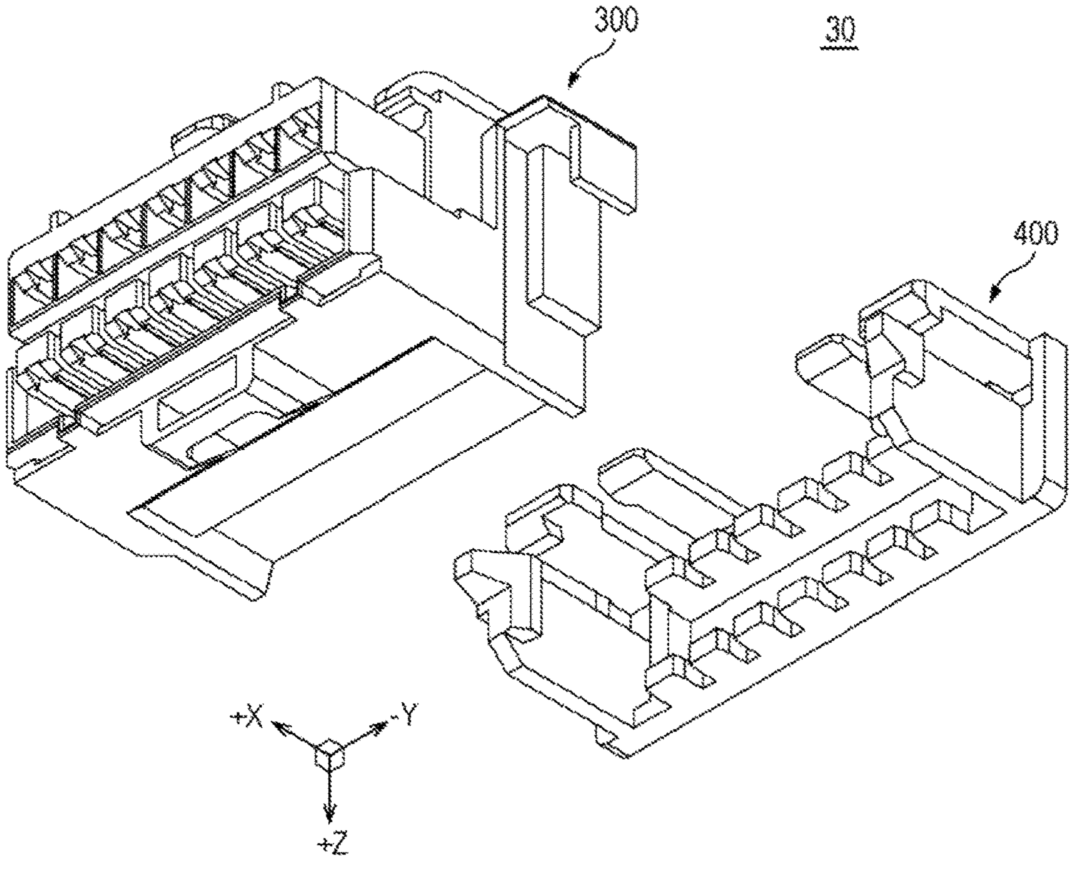
FIG. 16 is a perspective view of an electrical connector 30 according to a second embodiment of the present disclosure, in which a housing and a TPA member are completely separated from each other.
Figure 17:
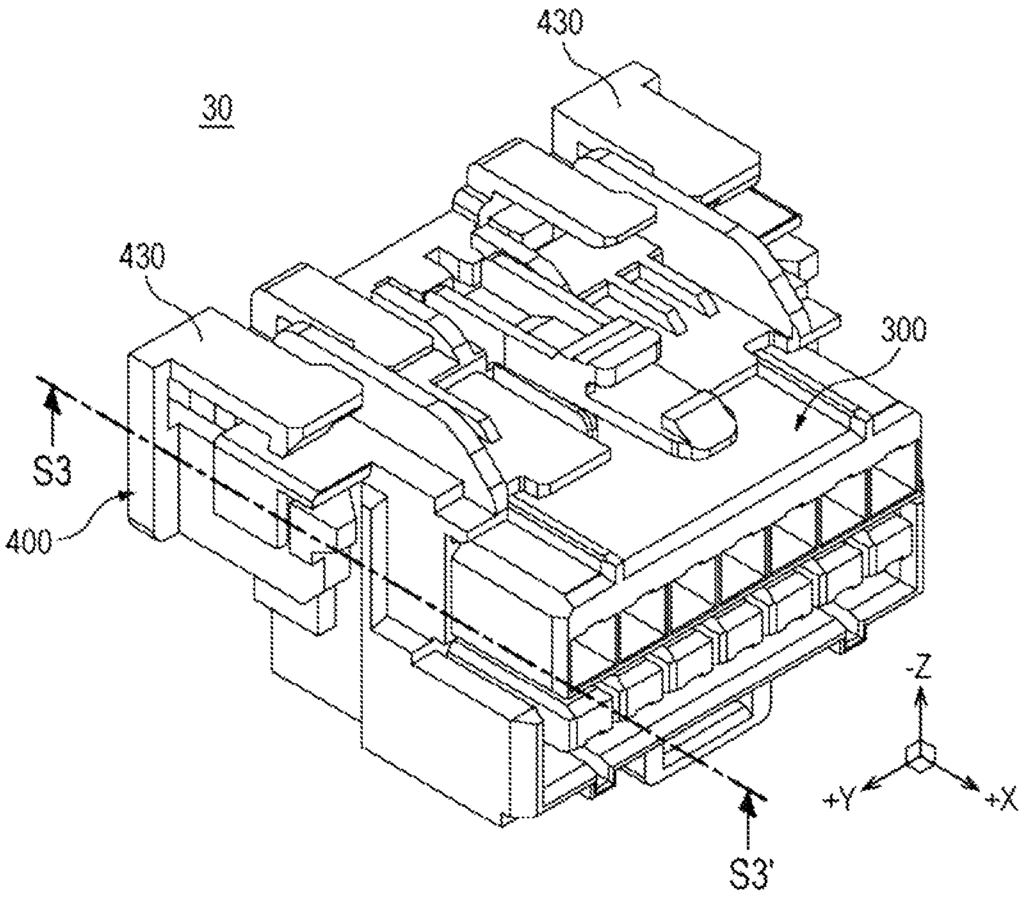
FIG. 17 is a perspective view of the electrical connector 30 according to the second embodiment of the present disclosure, in which the housing and the TPA member are in preliminary mounting positions.
Figure 20:
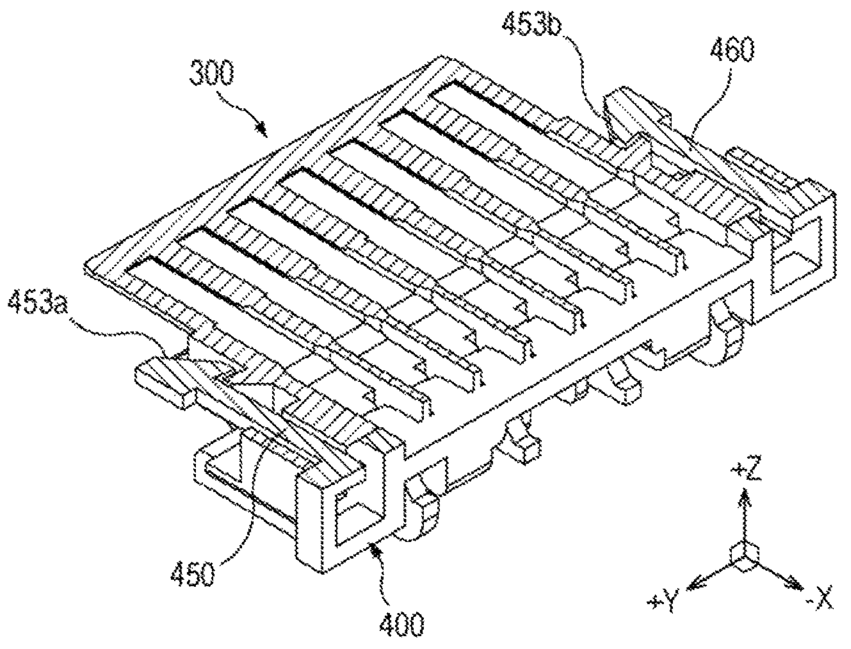
FIG. 20 is a cross-sectional view of the electrical connector 30 of FIG. 16, taken on line S3-S3' when it is in a final mounting position.

Referring to FIGS. 16 to 20, differences of an electrical connector 50 according to a second embodiment from the electrical connector 10 according to the first embodiment described above will be highlighted. In the second embodiment, a coupling method between a TPA member 400 and a housing 300 may be achieved by a structure in which a hook is provided on a cantilever arm of the TPA member 400 and a concave portion or a stepped portion is formed on the housing 300 corresponding thereto. FIG. 16 illustrates a virtual state in which the housing 300 and the TPA member 400 are completely separated from each other for convenience of explanation of respective components. FIGS. 17 and 18 illustrate an embodiment in which a bottom cantilever arm 430 of the TPA member 400 includes a hook shape and is coupled with the housing 300 in a hook coupling method. FIGS. 19 and 20 illustrate an embodiment in which first and second side cantilever arms 450, 460 of the TPA member 400 include a hook shape and are coupled with the housing 300 in a hook coupling method.

Figure 21:
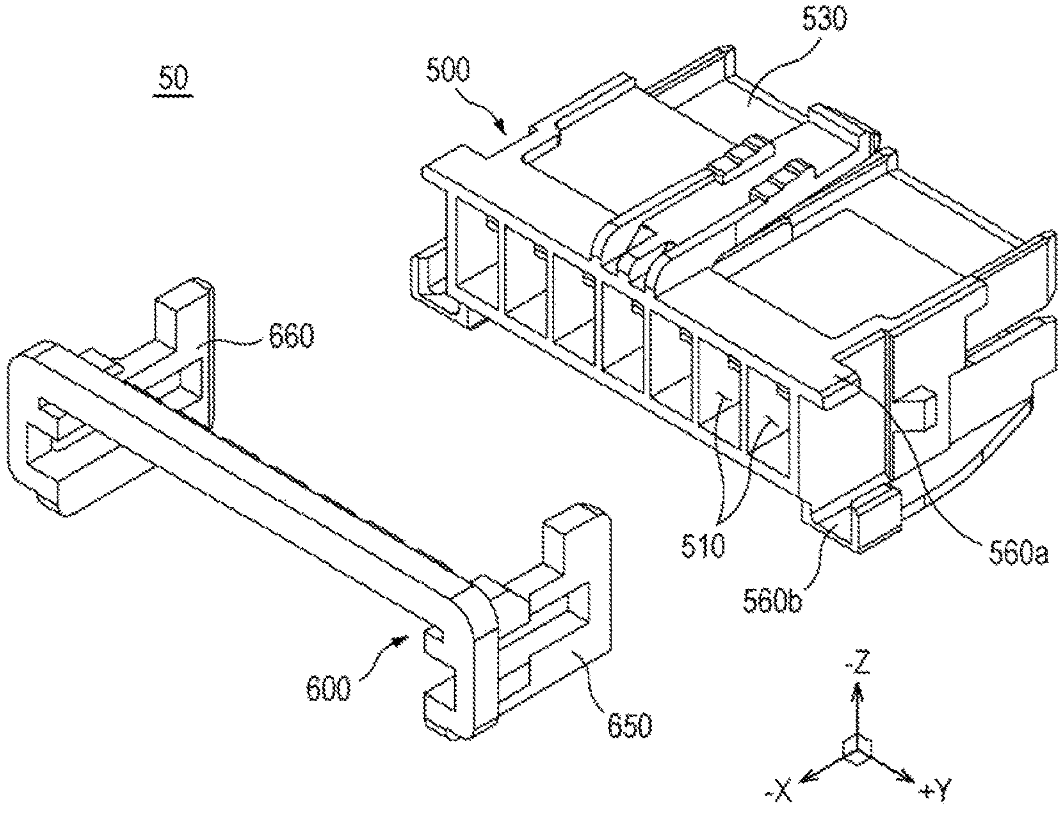
FIG. 21 is a perspective view of an electrical connector 50 according to a third embodiment of the present disclosure, in which a housing and a TPA member are completely separated from each other.
Figure 22:
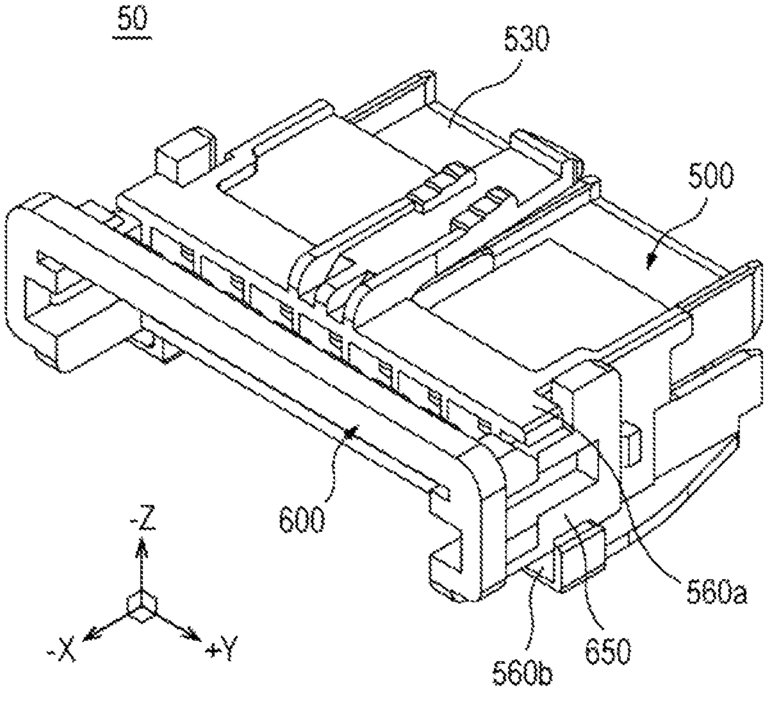
FIG. 22 is a perspective view of the electrical connector 50 according to the third embodiment of the present disclosure, in which the housing and the TPA member are in preliminary mounting positions.
Figure 23:
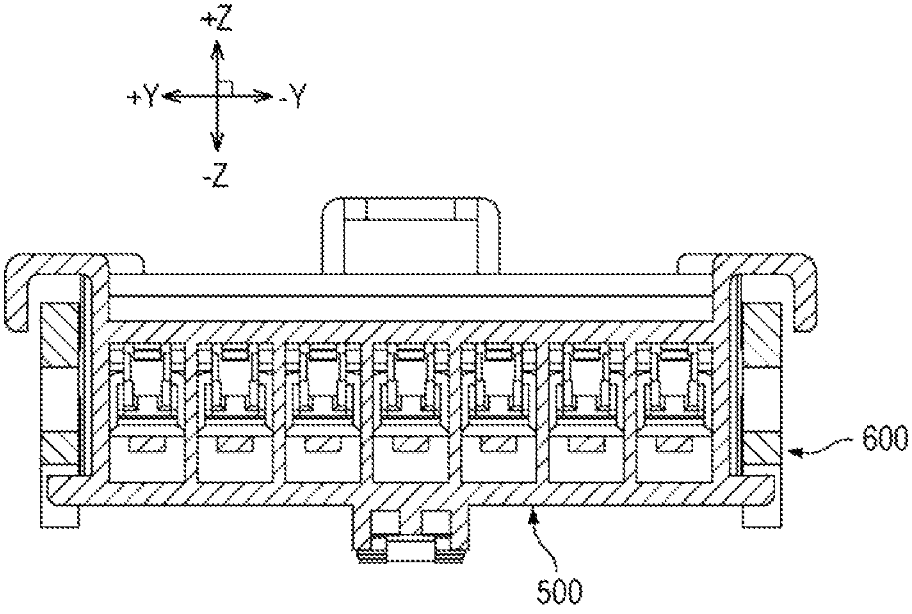
FIG. 23 is a cross-sectional view of the electrical connector 50 of FIG. 22.

Hereinafter, differences of an electrical connector 50 according to a third embodiment from the electrical connector 10 according to the first embodiment described above will be highlighted with reference to FIGS. 21 to 24. FIG. 21 illustrates the electrical connector 50 according to the third embodiment of the present disclosure, in which a housing 500 and a TPA member 600 are completely separated from each other. FIG. 21 illustrates a virtual state in which the housing 500 and the TPA member 600 are completely separated from each other for convenience of explanation of respective components. FIGS. 22 and 23 illustrate the electrical connector 50 in a state where the housing and the TPA member 600 are in preliminary mounting positions. First and second side cantilever arms 650, 660 of the TPA member 600 may be latch-coupled with a sidewall (a sidewall in the Y-axis direction) of the housing in their corresponding positions, respectively.

The housing 500 of the electrical connector 50 may be configured to receive only a terminal of an array of a first row, and may have a terminal receiving opening 510 of the array of the first row. A connecting portion 530 of the array of the first row is provided on a side facing the terminal receiving opening 510 to be coupled with another separate electrical connector C50. The housing 500 includes a locking projection 560*a* to prevent the TPA member 600 from being separated from the housing 500 when the TPA member 600 is in the preliminary mounting position or while the terminal array is being inserted into the housing 500. The housing 500 includes a rotation prevention projection 560*b* to prevent the TPA member 600 from rotating about the Y-axis in the counter clockwise direction by a predetermined level or more from the direction we are looking at the drawing. The rotation prevention projections 560*b* may be formed on left and right sidewalls (both sidewalls perpendicular to the Y-axis direction) of the housing 500, respectively.

Figure 24:
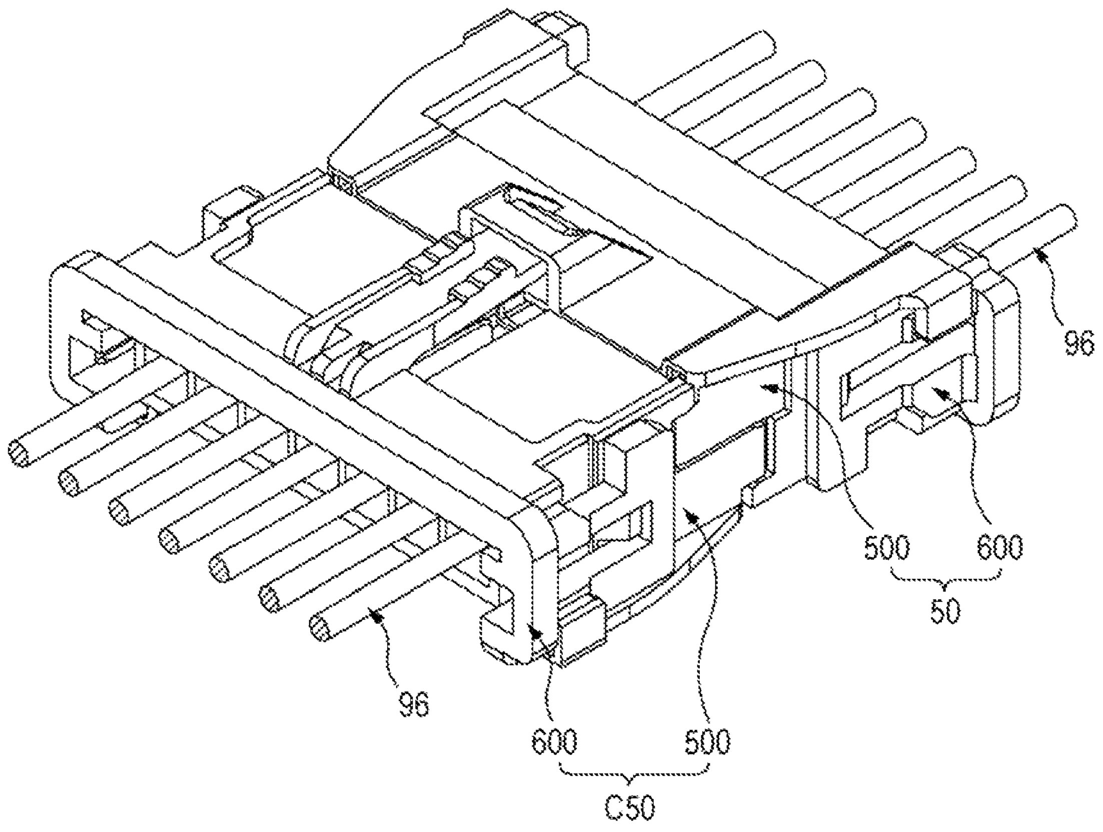
FIG. 24 is a perspective view illustrating a state in which the electrical connector 50 having a plurality of terminals mounted therein according to the third embodiment of the present disclosure is disposed to have rotational symmetry with another electrical connector having the same shape and is coupled therewith.

The electrical connector 50 may be a genderless connector that is configured to be able to be coupled with another separate electrical connector C50 having the same shape. Referring to FIG. 24, the electrical connector 50 may be coupled with another electrical connector C50 having the same shape in the rotational symmetry state. To achieve this, the electrical connector 50 may not be provided with the partition 135 and the layer film 136.

In another embodiment, each of the connecting portions 530 of the housing 500 of the electrical connector 50 may be configured to be half of the height of the sidewall or lower. In this case, a sidewall of the connecting portion 530 may be coupled with a sidewall of the connecting portion 530 of another electrical connector, thereby forming a passage of the terminal receiving opening 510.

When the electrical connector 10, 30, 50 according to the present disclosure is manufactured, an external injecting molding part may be inserted into a gap between the housing 100, 300, 500 and the TPA member 200, 400, 600 in order to injection mold the housing 100, 300, 500 and the TPA member 200, 400, 600 simultaneously, and in this case, when the housing 100, 300, 500 and the TPA member 200, 400, 600 are injection molded and then the injection molding part is removed, the housing 100, 300, 500 and the TPA member 200, 400, 600 may be molded as separate members in the preliminary coupling state without undergoing a separate assembly process.

The housing 100, 300, 500 and the TPA member 200, 400, 600 may be configured, so that in the state where the TPA member 200, 400, 600 is disposed in the relative position, the gap between the housing 100, 300, 500 and the TPA member 200, 400, 600 is formed of spaces to allow one of a plurality of external injection molding parts (referred to as a 'partition injection molding part') to be inserted thereinto from the outside in a linear direction. Through this, in the manufacturing process of the electrical connector 10, the housing 100, 300, 500 and the TPA member 200, 400, 600 are injection molded and cured with the partition injection molding part being inserted into the space between the housing 100, 300, 500 and the TPA member 200, 400, 600, and then, the housing 100, 300, 500 and the TPA member 200, 400, 600 in the preliminary mounting positions may be manufactured by drawing out the partition injection molding part to the outside in the linear direction. All spaces forming the gap between the housing 100, 300, 500 and the TPA member 200, 400, 600 may be formed by the partition injection molding part (not shown) which can be inserted in the linear direction, respectively. For example, a space g1 (see FIG. 19) among the spaces forming the gap may be formed by a partition injection molding part which can be inserted from the outside in the +Z-axis direction, and a gap g2 (see FIG. 19) among the spaces forming the gap may be formed by a partition injection molding part which can be inserted from the outside in the +X-axis direction.

In an embodiment, the TPA member 200, 400, 600 may be configured to be locked by the locking projection when the TPA member 200, 400, 600 moves from the preliminary mounting position in the −X-axis direction, and to be prevented from being separated from the housing 100, 300, 500. In this case, the TPA member 200, 400, 600 and the housing 100, 300, 500 may be configured to be prevented from being completely separated from each other through deformation within an elastic limit range. In addition, if the TPA member 200, 400, 600 and the housing 100, 300, 500 are separately molded in a complete separation state, not in the preliminary mounting positions, it may be impossible to couple the TPA member 200, 400, 600 and the housing 100, 300, 500 due to the locking projection. According to these embodiments, the TPA member 200, 400, 600 may be made to go into a preliminary coupling state to the housing 100, 300, 500 (that is, a state in the preliminary mounting position), and also, may be prevented from being completely separated and removed from the housing 100, 300, 500, so that a work for disposing a terminal in the housing is easy to perform, and the TPA member can be prevented from being separated from the housing and being lost.

Although the technical concept of the present disclosure has been described through some embodiments described above and examples illustrated in the accompanying drawings, it should be noted that various substitutions, modifications, and changes can be made without departing from the technical concept and the scope of the present disclosure that can be understood by those skilled in the art to which the present disclosure belongs. In addition, the substitutions, modification, and changes should be deemed to belong to the claims attached hereto.

The invention claimed is:

1. An electrical connector comprising:

a housing having a terminal receiving opening and a locking projection; and a TPA member comprising first and second side cantilever arms and at least one bottom cantilever arm, the first and second side cantilever arms extending from both ends of the TPA member and the at least one bottom cantilever arm extending from a lower portion of the TPA member, wherein, in a preliminary mounting position, the locking projection of the housing prevents the TPA member from being separated from the housing; and wherein, in a final mounting position, the first and second side cantilever arms are positioned outside a sidewall of the housing and are latch-coupled to the housing, the at least one bottom cantilever arm is positioned outside a bottom of the housing and is latched-coupled to the housing, and the TPA member is mounted outside the terminal receiving opening to fix a position of a terminal.

2. The electrical connector of claim 1, wherein, in the preliminary mounting position, the locking projection prevents the TPA member from being separated in a direction opposite a mating direction.

3. The electrical connector of 1, wherein the housing and the TPA member are formed by injecting molding a single time in a single injection mold and are disposed in the preliminary mounting position as they are.

4. The electrical connector of claim 1, wherein the housing further comprises a guide rib to guide a movement of the TPA member when the TPA member moves from the preliminary mounting position to the final mounting position.

5. The electrical connector of claim 1, wherein the TPA member further comprises a plurality of toothed portions which are disposed outside the plurality of terminal receiving openings of the housing in the preliminary mounting position.

6. The electrical connector of claim 5, wherein each of the plurality of terminal receiving openings of the housing comprises a finger portion disposed therein to prevent the terminal from being separated or shaking in a direction perpendicular to a receiving direction of the terminal after the terminal is mounted in the terminal receiving opening.

7. The electrical connector of claim 6, wherein, in the final mounting position, each of the plurality of toothed portions prevents the terminal from being separated or shaking forward and backward in the receiving direction of the terminal in cooperation with the finger portion of the corresponding terminal receiving opening.

8. The electrical connector of claim 1, wherein the housing further comprises a connecting portion which is disposed on a side to be coupled with another electrical connector, and wherein the connecting portion of the electrical connector has rotational symmetry with a connecting portion of the another electrical connector.

9. The electrical connector of claim 8, wherein the plurality of terminal receiving openings have terminal receiving openings of a first group and terminal receiving openings of a second group which are arranged in two rows one on the other.

10. The electrical connector of claim 8, wherein the housing comprises a female latch portion on one side and a male latch portion on the other side facing the one side, and wherein the male latch portion has a bending portion of a cascade shape.

11. A TPA member comprising:

first and second side cantilever arms, the first and second side cantilever arms extending from both ends of the TPA member; and at least one bottom cantilever arm, the at least one bottom cantilever arm extending from a lower portion of the TPA member, wherein, in a preliminary mounting position, the TPA member is prevented from separating from a housing of an electrical connector by a locking projection of the housing; and wherein, in a final mounting position, the first and second side cantilever arms are positioned outside a sidewall of the housing and are latch-coupled to the housing, the at least one bottom cantilever arm is positioned outside a bottom of the housing and is latch-coupled to the housing, and the TPA member is mounted outside a terminal receiving opening of the housing to fix a position of a terminal.

12. The TPA member of claim 11, wherein the TPA member further comprises a plurality of toothed portions which are disposed outside a plurality of terminal receiving openings of the housing in the preliminary mounting position, and wherein, in the final mounting position, each of the plurality of toothed portions is inserted into the corresponding terminal receiving opening to prevent separation or shaking forward and backward in a receiving direction of the terminal.

13. An electrical connector assembly comprising:

the electrical connector according to claim 6; and an electrical conductive terminal which is inserted into and fixed to the electrical connector, and has a terminal holder which is coupled with the finger portion of the electrical connector after being inserted into the electrical connector.

14. The electrical connector assembly of claim 13, wherein the electrical connector is able to be coupled with another electrical connector of the same shape as the electrical connector in a rotational symmetry state.

* * * * *